US012750890B2

(12) United States Patent
Zhang et al.

(10) Patent No.: US 12,750,890 B2
(45) Date of Patent: Sep. 29, 2026

(54) METHODS AND APPARATUSES FOR PHYSICAL RANDOM ACCESS CHANNEL (PRACH) REPETITION

(71) Applicant: LENOVO (BEIJING) LIMITED, Beijing (CN)

(72) Inventors: Yuantao Zhang, Beijing (CN); Hongmei Liu, Beijing (CN); Zhi Yan, Beijing (CN); Haiming Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 236 days.

(21) Appl. No.: 18/724,573

(22) PCT Filed: Jan. 17, 2022

(86) PCT No.: PCT/CN2022/072354

§ 371 (c)(1),
(2) Date: Jun. 26, 2024

(87) PCT Pub. No.: WO2023/133890

PCT Pub. Date: Jul. 20, 2023

(65) Prior Publication Data

US 2025/0071817 A1 Feb. 27, 2025

(51) Int. Cl.

*H04W 74/0833* (2024.01)
*H04W 72/0453* (2023.01)
*H04W 74/0838* (2024.01)

(52) U.S. Cl.

CPC ... *H04W 74/0833* (2013.01); *H04W 72/0453* (2013.01); *H04W 74/0838* (2024.01)

(58) Field of Classification Search

CPC ......... H04W 74/0833; H04W 72/0453; H04W 74/0838; H04L 5/0048

(Continued)

(56) References Cited

U.S. PATENT DOCUMENTS

2020/0059970 A1 2/2020 Islam
2021/0014902 A1* 1/2021 Guo .................... H04W 74/002

(Continued)

FOREIGN PATENT DOCUMENTS

CN 113630764 A 11/2021
EP 3925371 A1 12/2021

(Continued)

OTHER PUBLICATIONS

Hua Wei et al. "Discussion on channel structure of 2-step RACH" 3GPP TSG RAN WG1 Meeting #99, R1-1911871, Nov. 22, 2019; 11 pages.

(Continued)

*Primary Examiner* — Michael Y Mapa

(74) *Attorney, Agent, or Firm* — AMPACC Law Group, PLLC

(57) ABSTRACT

Embodiments of the present disclosure relate to methods and apparatuses for physical random access channel (PRACH) repetition. According to an embodiment of the present disclosure, a user equipment (UE) can include: a receiver that receives configuration information; a processor coupled to the receiver, wherein the processor: determines a plurality of synchronization signal block (SSB) patterns based on the configuration information, wherein each SSB pattern includes one or more SSBs; determines an SSB pattern from the plurality of SSB patterns; determines a set of random access channel (RACH) occasions (ROs) for PRACH repetition based on the determined SSB pattern; determines, from the plurality of SSB patterns, a set of SSB patterns associated with each RO of the set of ROs, wherein the set of SSB patterns include the determined SSB pattern; and determines a set of preambles associated with each SSB pattern of the set of SSB patterns; and a transmitter coupled to the processor.

20 Claims, 7 Drawing Sheets

(58) Field of Classification Search
USPC ............ 370/329; 455/434, 515, 435.1–435.3
See application file for complete search history.

(56) References Cited

U.S. PATENT DOCUMENTS

| | | | | |
|---|---|---|---|---|
| 2024/0305350 | A1* | 9/2024 | Li | H04L 5/0053 |
| 2024/0349256 | A1* | 10/2024 | Yang | H04W 72/0446 |

FOREIGN PATENT DOCUMENTS

| | | | |
|---|---|---|---|
| WO | 2020164540 | A1 | 8/2020 |
| WO | 2021/087978 | A1 | 5/2021 |

OTHER PUBLICATIONS

International Search Report and Written Opinion dated Sep. 27, 2022 for International application No. PCT/CN2022/072354.
European search report dated Sep. 8, 2025 for European patent application No. 22919536.7.

* cited by examiner

METHODS AND APPARATUSES FOR PHYSICAL RANDOM ACCESS CHANNEL (PRACH) REPETITION

CROSS REFERENCE TO RELATED APPLICATIONS

This application is a national phase entry of International Application No. PCT/CN2022/072354, filed on Jan. 17, 2022, which is incorporated by reference in its entirety.

TECHNICAL FIELD

Embodiments of the present application generally relate to wireless communication technology, especially to methods and apparatuses for physical random access channel (PRACH) repetition.

BACKGROUND

In new radio (NR) system, a random access procedure may be utilized for various purposes. For example, it may be utilized by a user equipment (UE) in initial access to find a cell to camp on; or it may be utilized by a UE which is in a radio resource control (RRC)_IDLE state or RRC_INACTIVE state to switch to an RRC_CONNECTED state to start data transmission or reception; or it may be utilized by a UE in an RRC_CONNECTED state to re-establish the lost uplink (UL) synchronization, etc.

The UE may start a random access procedure by transmitting a preamble in a PRACH. In some cases, the PRACH may be the bottleneck channel which has the worst coverage performance. Given this, how to improve the coverage of the PRACH needs to be addressed.

SUMMARY OF THE APPLICATION

Embodiments of the present application at least provide technical solutions for PRACH repetition.

According to some embodiments of the present application, a UE may include: a receiver that receives configuration information; a processor coupled to the receiver, wherein the processor: determines a plurality of synchronization signal block (SSB) patterns based on the configuration information, wherein each SSB pattern includes one or more SSBs; determines an SSB pattern from the plurality of SSB patterns; determines a set of random access channel (RACH) occasions (ROs) for physical random access channel (PRACH) repetition based on the determined SSB pattern; determines, from the plurality of SSB patterns, a set of SSB patterns associated with each RO of the set of ROs, wherein the set of SSB patterns include the determined SSB pattern; and determines a set of preambles associated with each SSB pattern of the set of SSB patterns; and a transmitter coupled to the processor.

In some embodiments of the present application, the configuration information includes the plurality of SSB patterns, or the configuration information includes a set of offsets for determining the plurality of SSB patterns.

In some embodiments of the present application, the SSB pattern is determined based on a measurement of a channel quality of SSB(s) included in each SSB pattern of the plurality of SSB patterns.

In some embodiments of the present application, the set of ROs are determined from a start of an SSB to RO mapping cycle, or from a start of an SSB to RO association period, or from a start of an SSB to RO association pattern period.

In some embodiments of the present application, the processor further determines an SSB pattern to be associated with an RO of the set of ROs in the case that the SSB pattern includes an SSB associated with the RO.

In some embodiments of the present application, the processor: partitions a plurality of preambles for the set of SSB patterns into a plurality of sets of preambles; and orders SSB pattern(s) in the set of SSB patterns; wherein the set of preambles associated with each SSB pattern of the set of SSB patterns is determined from the plurality of sets of preambles based on an order of each SSB pattern in the set of SSB patterns.

In some embodiments of the present application, for each RO of the set of ROs, the SSB pattern(s) in the set of SSB patterns associated with the RO are ordered based on the same ordering scheme.

In some embodiments of the present application, the same ordering scheme includes: firstly ordering SSB pattern(s) of a first SSB in the set of SSB patterns associated with an RO according to orders of the SSB pattern(s) of the first SSB in the plurality of SSB patterns; and secondly ordering SSB pattern(s) based on an increasing order of index(es) of SSB(s) associated with the RO.

In some embodiments of the present application, for each RO of the set of ROs, the SSB pattern(s) in the set of SSB patterns are ordered based on a differential ordering scheme, wherein the differential ordering scheme includes ordering SSB pattern(s) in a set of SSB patterns associated with a latter RO based on order(s) of SSB pattern(s) in a set of SSB patterns associated with former RO(s).

In some embodiments of the present application, the processor: for an SSB pattern associated with both a former RO and the latter RO, determines an order of the SSB pattern in a set of SSB patterns associated with the latter RO to be the same as an order of the SSB pattern in a set of SSB patterns associated with the former RO.

In some embodiments of the present application, the processor further selects a preamble from a set of preambles associated the determined SSB pattern, and wherein the transmitter further transmits the preamble in each RO of the set of ROs.

In some embodiments of the present application, the processor: starts a random access response (RAR) window after a time gap relative to a transmission of the preamble in a first RO of the set of ROs; and in the case that an RAR is received in the RAR window before finishing transmitting the preamble in all ROs of the set of ROs, terminates transmitting the preamble.

In some embodiments of the present application, the processor further determines a beam for transmitting messages after preamble transmission based on a random access radio network temporary identifier (RA-RNTI) associated with downlink control information (DCI) scheduling an RAR.

According to some other embodiments of the present application, a base station (BS) may include: a transmitter that transmits a configuration information; a processor coupled to the receiver, wherein the processor: determines a plurality of SSB patterns, wherein each SSB pattern of the plurality of SSB patterns includes one or more SSBs; determines, for an SSB pattern of the plurality of SSB patterns, a set of ROs for PRACH repetition based on the SSB pattern; determines, from the plurality of SSB patterns, a set of SSB patterns associated with each RO of the set of ROs, wherein the set of SSB patterns include the SSB pattern; and determines a set of preambles associated with each SSB pattern of the set of SSB patterns; and a receiver coupled to the processor.

In some embodiments of the present application, the configuration information includes the plurality of SSB patterns or the configuration information includes a set of offsets for determining the plurality of SSB patterns.

In some embodiments of the present application, the set of ROs are determined from a start of an SSB to RO mapping cycle, or from a start of an SSB to RO association period, or from a start of an SSB to RO association pattern period.

In some embodiments of the present application, the processor further determines an SSB pattern to be associated with an RO of the set of ROs in the case that the SSB pattern includes an SSB associated with the RO.

In some embodiments of the present application, the processor: partitions a plurality of preambles for the set of SSB patterns into a plurality of sets of preambles; and orders SSB pattern(s) in the set of SSB patterns; wherein the set of preambles associated with each SSB pattern of the set of SSB patterns is determined from the plurality of sets of preambles based on an order of each SSB pattern in the set of SSB patterns.

In some embodiments of the present application, for each RO of the set of ROs, the SSB pattern(s) in the set of SSB patterns associated with the RO are ordered based on the same ordering scheme.

In some embodiments of the present application, the same ordering scheme includes: firstly ordering SSB pattern(s) of a first SSB in the set of SSB patterns associated with an RO according to orders of the SSB pattern(s) of the first SSB in the plurality of SSB patterns; and secondly ordering SSB pattern(s) based on an increasing order of index(es) of SSB(s) associated with the RO.

In some embodiments of the present application, for each RO of the set of ROs, the SSB pattern(s) in the set of SSB patterns are ordered based on a differential ordering scheme, wherein the differential ordering scheme includes ordering SSB pattern(s) in a set of SSB patterns associated with a latter RO based on order(s) of SSB pattern(s) in a set of SSB patterns associated with former RO(s).

In some embodiments of the present application, the processor: for an SSB pattern associated with both a former RO and the latter RO, determines an order of the SSB pattern in a set of SSB patterns associated with the latter RO to be the same as an order of the SSB pattern in a set of SSB patterns associated with the former RO.

In some embodiments of the present application, the processor further monitors each preamble from a set of preambles associated with the SSB pattern, and wherein the receiver further receives a preamble of the set of preambles in each RO of the set of ROs.

In some embodiments of the present application, the processor: starts a RAR window after a time gap relative to a reception of the preamble in a first RO of the set of ROs; and in the case that an RAR is transmitted in the RAR window before finishing receiving the preamble in all ROs of the set of ROs, terminates receiving the preamble.

In some embodiments of the present application, the processor further transmits DCI scheduling an RAR, wherein the DCI is associated with a RA-RNTI.

According to some other embodiments of the present application, a method performed by a UE may include: receiving configuration information; determining a plurality of SSB patterns, wherein each SSB pattern includes one or more SSBs; determining an SSB pattern from the plurality of SSB patterns; determining a set of ROs for PRACH repetition based on the determined SSB pattern; determining, from the plurality of SSB patterns, a set of SSB patterns associated with each RO of the set of ROs, wherein the set of SSB patterns include the determined SSB pattern; and determining a set of preambles associated with each SSB pattern of the set of SSB patterns.

In some embodiments of the present application, the configuration information includes the plurality of SSB patterns, or the configuration information includes a set of offsets for determining the plurality of SSB patterns.

In some embodiments of the present application, the SSB pattern is determined based on a measurement of a channel quality of SSB(s) included in each SSB pattern of the plurality of SSB patterns.

In some embodiments of the present application, the set of ROs are determined from a start of an SSB to RO mapping cycle, or from a start of an SSB to RO association period, or from a start of an SSB to RO association pattern period.

In some embodiments of the present application, the method may further include: determining an SSB pattern to be associated with an RO of the set of ROs in the case that the SSB pattern includes an SSB associated with the RO.

In some embodiments of the present application, the method may further include: partitioning a plurality of preambles for the set of SSB patterns into a plurality of sets of preambles; and ordering SSB pattern(s) in the set of SSB patterns; wherein the set of preambles associated with each SSB pattern of the set of SSB patterns is determined from the plurality of sets of preambles based on an order of each SSB pattern in the set of SSB patterns.

In some embodiments of the present application, for each RO of the set of ROs, the SSB pattern(s) in the set of SSB patterns associated with the RO are ordered based on the same ordering scheme.

In some embodiments of the present application, the same ordering scheme includes: ordering the SSB pattern(s) in the set of SSB patterns associated with an RO according to orders of the SSB pattern(s) in the plurality of SSB patterns; and then ordering the ordered SSB pattern(s) based on an increasing order of index(es) of SSB(s) associated with the RO.

In some embodiments of the present application, for each RO of the set of ROs, the SSB pattern(s) in the set of SSB patterns are ordered based on a differential ordering scheme, wherein the differential ordering scheme includes ordering SSB pattern(s) in a set of SSB patterns associated with a latter RO based on order(s) of SSB pattern(s) in a set of SSB patterns associated with former RO(s).

In some embodiments of the present application, the method may further include: for an SSB pattern associated with both a former RO and the latter RO, determining an order of the SSB pattern in a set of SSB patterns associated with the latter RO to be the same as an order of the SSB pattern in a set of SSB patterns associated with the former RO.

In some embodiments of the present application, the method may further include: selecting a preamble from a set of preambles associated the determined SSB pattern, and wherein the transmitter further transmits the preamble in each RO of the set of ROs.

In some embodiments of the present application, the method may further include: starting an RAR window after a time gap relative to a transmission of the preamble in a first RO of the set of ROs; and in the case that an RAR is received in the RAR window before finishing transmitting the preamble in all ROs of the set of ROs, terminating transmitting the preamble.

In some embodiments of the present application, the method may further include: determining a beam for transmitting messages after preamble transmission based on an RA-RNTI associated with DCI scheduling an RAR.

According to some other embodiments of the present application, a method performed by a BS may include: transmitting a configuration information; determining a plurality of SSB patterns, wherein each SSB pattern of the plurality of SSB patterns includes one or more SSBs; determining, for an SSB pattern of the plurality of SSB patterns, a set of ROs for PRACH repetition based on the SSB pattern; determining, from the plurality of SSB patterns, a set of SSB patterns associated with each RO of the set of ROs, wherein the set of SSB patterns include the SSB pattern; and determining a set of preambles associated with each SSB pattern of the set of SSB patterns.

In some embodiments of the present application, the configuration information includes the plurality of SSB patterns or the configuration information includes a set of offsets for determining the plurality of SSB patterns.

In some embodiments of the present application, the set of ROs are determined from a start of an SSB to RO mapping cycle, or from a start of an SSB to RO association period, or from a start of an SSB to RO association pattern period.

In some embodiments of the present application, the method may further include: determining an SSB pattern to be associated with an RO of the set of ROs in the case that the SSB pattern includes an SSB associated with the RO.

In some embodiments of the present application, the method may further include: partitioning a plurality of preambles for the set of SSB patterns into a plurality of sets of preambles; and ordering SSB pattern(s) in the set of SSB patterns; wherein the set of preambles associated with each SSB pattern of the set of SSB patterns is determined from the plurality of sets of preambles based on an order of each SSB pattern in the set of SSB patterns.

In some embodiments of the present application, for each RO of the set of ROs, the SSB pattern(s) in the set of SSB patterns associated with the RO are ordered based on the same ordering scheme.

In some embodiments of the present application, the same ordering scheme includes: ordering the SSB pattern(s) in the set of SSB patterns associated with an RO according to orders of the SSB pattern(s) in the plurality of SSB patterns; and then ordering the ordered SSB pattern(s) based on an increasing order of index(es) of SSB(s) associated with the RO.

In some embodiments of the present application, for each RO of the set of ROs, the SSB pattern(s) in the set of SSB patterns are ordered based on a differential ordering scheme, wherein the differential ordering scheme includes ordering SSB pattern(s) in a set of SSB patterns associated with a latter RO based on order(s) of SSB pattern(s) in a set of SSB patterns associated with former RO(s).

In some embodiments of the present application, the method may further include: for an SSB pattern associated with both a former RO and the latter RO, determining an order of the SSB pattern in a set of SSB patterns associated with the latter RO to be the same as an order of the SSB pattern in a set of SSB patterns associated with the former RO.

In some embodiments of the present application, the method may further include: monitoring each preamble from a set of preambles associated with the SSB pattern, and wherein the receiver further receives a preamble of the set of preambles in each RO of the set of ROs.

In some embodiments of the present application, the method may further include: starting a RAR window after a time gap relative to a reception of the preamble in a first RO of the set of ROs; and in the case that an RAR is transmitted in the RAR window before finishing receiving the preamble in all ROs of the set of ROs, terminating receiving the preamble.

In some embodiments of the present application, the method may further include: transmitting DCI scheduling an RAR, wherein the DCI is associated with a RA-RNTI.

Embodiments of the present application provide technical solutions for PRACH repetitions, which solves the technical problems for implementing the PRACH repetitions, thereby improving the coverage of the PRACH.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3rd generation partnership project (3GPP) 5G (i.e., NR), 3GPP long term evolution (LTE) Release 8 and so on. Persons skilled in the art know very well that, with the development of network architecture and new service scenarios, the embodiments in the present application are also applicable to similar technical problems; and moreover, the terminologies recited in the present application may change, which should not affect the principle of the present application.

Figure 1:
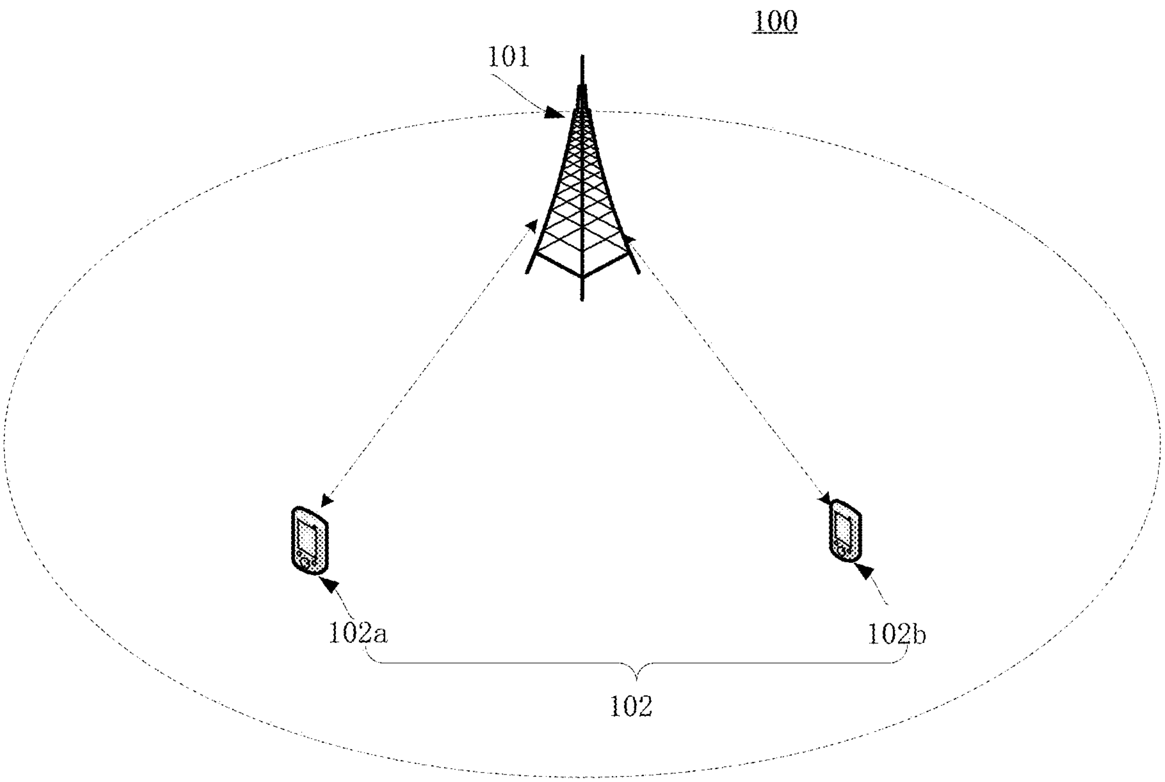
FIG. 1 is a schematic diagram illustrating an exemplary wireless communication system according to some embodiments of the present application.

FIG. 1 is a schematic diagram illustrating an exemplary wireless communication system 100 according to some embodiments of the present application.

As shown in FIG. 1, the wireless communication system 100 includes at least one base station (BS) 101 and at least one UE 102. In particular, the wireless communication system 100 includes one BS 101 and two UEs 102 (e.g., a UE 102*a* and a UE 102*b*) for illustrative purpose. Although a specific number of BS 101 and UEs 102 are depicted in FIG. 1, it is contemplated that any number of BSs 101 and UEs 102 may be included in the wireless communication system 100.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

The BS 101 may also be referred to as an access point, an access terminal, a base, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101.

According to some other embodiments of the present application, the UE(s) 102 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like.

According to some other embodiments of the present application, the UE(s) 102 may include a portable wireless communication device, a smart phone, a cellular telephone, a flip phone, a device having a subscriber identity module, a personal computer, a selective call receiver, or any other device that is capable of sending and receiving communication signals on a wireless network.

According to some other embodiments of the present application, the UE(s) 102 may include wearable devices, such as smart watches, fitness bands, optical head-mounted displays, or the like.

Moreover, the UE(s) 102 may be referred to as a subscriber unit, a mobile, a mobile station, a user, a terminal, a mobile terminal, a wireless terminal, a fixed terminal, a subscriber station, a user terminal, or a device, or described using other terminology used in the art.

According to some embodiments of the present application, the UE(s) 102 may include vehicle UEs (VUEs) and/or power-saving UEs (also referred to as power sensitive UEs). The power-saving UEs may include vulnerable road users (VRUs), public safety UEs (PS-UEs), and/or commercial sidelink UEs (CS-UEs) that are sensitive to power consumption. In an embodiment of the present application, a VRU may include a pedestrian UE (P-UE), a cyclist UE, a wheelchair UE or other UEs which require power saving compared with a VUE. In an embodiment of the present application, the UE 102*a* may be a power-saving UE and the UE 102*b* may be a VUE. In another embodiment of the present application, both the UE 102*a* and the UE 102*b* may be VUEs or power-saving UEs.

Both the UE 102*a* and the UE 102*b* in the embodiments of FIG. 1 are in a coverage area of the BS 101, and may transmit information or data to the BS 101 and receive control information or data from the BS 101, for example, via LTE or NR Uu interface. In other embodiments, one or more of the UE 102*a* and the UE 102*b* may be outside of the coverage area of the BS 101. The UE 102*a* and the UE 102*b* may communicate with each other via sidelink.

In new radio (NR) system, a random access procedure may be utilized for various purposes. For example, it may be utilized by a UE in initial access to find a cell to camp on; or it may be utilized by a UE which is in an RRC IDLE state or RRC_INACTIVE state to switch to an RRC_CONNECTED state to start data transmission or reception; or it may be utilized by a UE in an RRC_CONNECTED state to re-establish the lost UL synchronization, etc.

Figure 2:
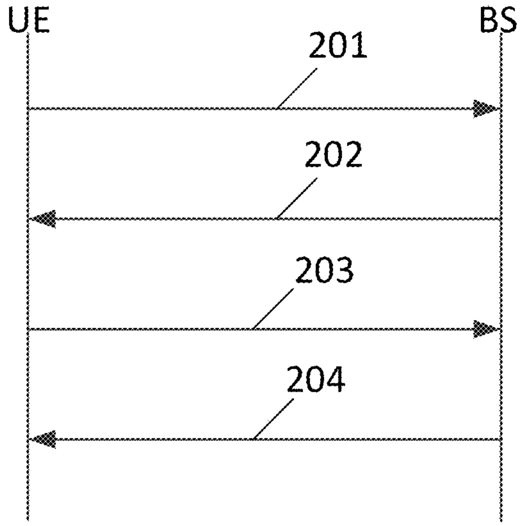
FIG. 2 illustrates an exemplary random access procedure according to some embodiments of the present application.

FIG. 2 illustrates an exemplary random access procedure according to some embodiments of the present application. In the embodiments of FIG. 2, the random access procedure may be a 4-step RACH procedure which includes steps 201-204.

Referring to FIG. 2, in step 201, a UE may transmit Msg1 in an RO to a BS. The Msg1 may include a preamble selected by the UE.

After receiving the Msg1, in step 202, the BS may transmit DCI scheduling a RAR (e.g., Msg2) to the UE. The DCI may be identified (e.g., scrambled) by an RA-RNTI which is determined by at least one of the time position or frequency position of the RO in which the preamble is transmitted. That is, for different RO, the corresponding RA-RNTI is different. The RAR may indicate a reception of the preamble and provide necessary information for the UE to transmit Msg3 and Msg4. For example, the RAR may include timing advance (TA) command, UL grant for transmitting Msg3, etc.

Consequently, in step 202, the UE may receive the RAR from the BS. Specifically, the UE may start an RAR window after a time gap relative to the transmission of Msg1. Within the RAR window, the UE may monitor DCI for scheduling the RAR and receives the RAR.

After receiving the RAR, in step 203, the UE may transmit Msg3 to the BS. The Msg3 may include an identity of the UE. After receiving the Msg3, in step 204, the BS may transmit Msg4 to the UE. The Msg4 may include the same identity of the UE included in Msg3 to indicate the success of the random access procedure of the UE. In other words, the Msg3 and Msg4 are used to solve potential collisions due to simultaneous transmissions of the same preamble from different UEs.

According to some embodiments of the present application, the BS may configure a plurality of ROs for transmitting the preamble, and the RO in step 201 may be determined from the plurality of ROs. For example, the BS may configure a subset of slots in a PRACH configuration period. Within the subset of slots, there may be one or more ROs, wherein each RO may cover multiple consecutive resource blocks (RBs) in the frequency domain.

An RO may be associated with one or more SSBs. An SSB may be associated with a beam. An SSB may include a primary synchronization signal (PSS), a secondary synchronization signal (SSS), and physical broadcast channel (PBCH), and may be used for the UE to synchronize to the downlink (DL), obtain the cell ID, acquire system information, etc.

In some embodiments of the present application, the association between SSB and RO may be configured by the BS to the UE. Specifically, the BS may transmit configuration information to the UE to indicate the association between SSB and RO. For example, the configuration information may indicate that one SSB is associated with one RO (which is referred to as 1-to-1 association hereinafter). In another example, the configuration information may indicate that more than one SSB is associated with one RO (which is referred to as N-to-1 association hereinafter). In yet another example, the configuration information may indicate that one SSB is associated with more than one RO (which is referred to as 1-to-N association hereinafter).

In some embodiments of the present application, the BS may configure a plurality of SSBs for a UE (e.g., via system information). In such embodiments, the UE may obtain plurality of SSBs (e.g., the UE may obtain the indexes of the plurality of SSBs in the system information). Then, the UE may measure the channel status of each SSB of the plurality of SSB, select one SSB with good channel quality, and transmit the preamble in a RO which is associated with the one SSB.

Figure 3A:
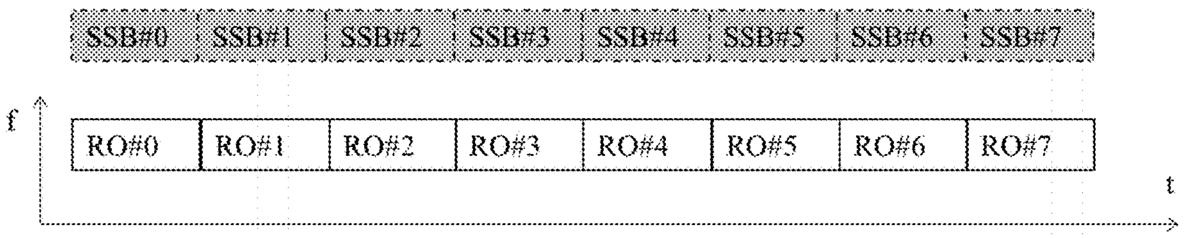
FIG. 3A-3C illustrates three exemplary associations between RO and SSB according to some embodiments of the present application.
Figure 3B:
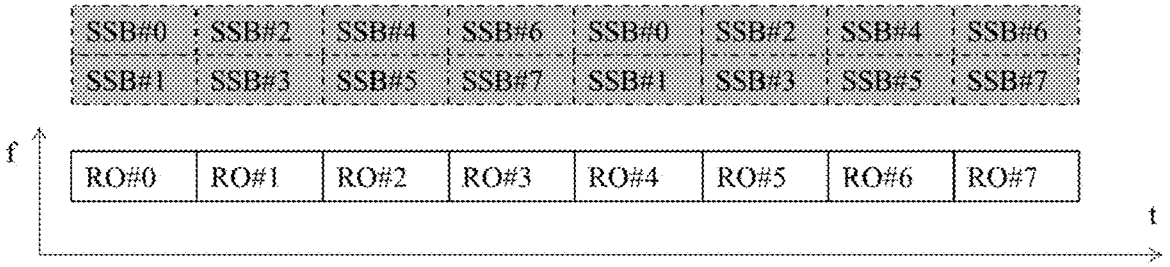
Figure 3C:
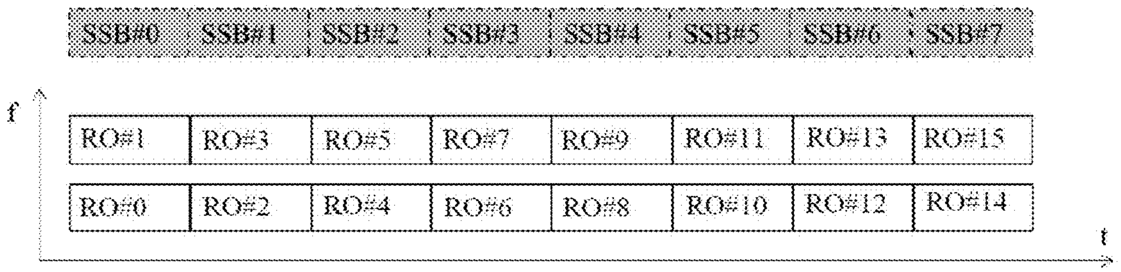

FIG. 3A-3C illustrates three exemplary associations between RO and SSB according to some embodiments of the present application.

Referring to FIG. 3A, it shows a 1-to-1 association between SSB and RO. In FIG. 3A, it is assumed that there are 8 SSBs indexed with SSB #0 to SSB #7 and the association between SSB and RO is 1-to-1 association. Moreover, it is assumed that there is one RO in the frequency domain and the association period includes 8 ROs indexed with RO #0 to RO #7. Then, SSB #0 to SSB #7 may be mapped to RO #0 to RO #7, respectively.

Referring to FIG. 3B, it shows an N-to-1 association between SSB and RO. In FIG. 3B, it is assumed that there are 8 SSBs indexed with SSB #0 to SSB #7 and the association between SSB and RO is 2-to-1 association. Moreover, it is assumed that there is one RO in the frequency domain and the association period includes 8 ROs indexed with RO #0 to RO #7. Then, SSB #0 and SSB #1 may be associated with RO #0, SSB #2 and SSB #3 may be associated with RO #1, SSB #4 and SSB #5 may be associated with RO #2, SSB #6 and SSB #7 may be associated with RO #3, SSB #0 and SSB #1 may be associated with RO #4, SSB #2 and SSB #3 may be associated with RO #5, SSB #4 and SSB #5 may be associated with RO #6, SSB #6 and SSB #7 may be associated with RO #7.

Referring to FIG. 3C, it shows a 1-to-N association between SSB and RO. In FIG. 3C, it is assumed that there are 8 SSBs indexed with SSB #0 to SSB #7 and the association between SSB and RO is 1-to-2 association. Moreover, it is assumed that there are two ROs in the frequency domain and the association period includes 16 ROs indexed with RO #0 to RO #15. Then, SSB #0 may be associated with RO #0 and RO #1, SSB #1 may be associated with RO #2 and RO #3, SSB #2 may be associated with RO #4 and RO #5, SSB #3 may be associated with RO #6 and RO #7, SSB #4 may be associated with RO #8 and RO #9, SSB #5 may be associated with RO #10 and RO #11, SSB #6 may be associated with RO #12 and RO #13, SSB #7 may be associated with RO #14 and RO #15.

In some embodiments of the present application, the association between SSB and RO may be performed periodically in each SSB to RO association period. The association period is X (e.g., X is an integer layer than 0) times of the PRACH configuration period, and contains one or more SSB to RO mapping cycles. In an embodiment of the present application, the duration of SSB to RO association period is the minimum period such that within the SSB to RO association period, each SSB is associated with at least one RO.

NR supports preamble transmission without repetition. However, in some cases, the PRACH may be the bottleneck channel which has the worst coverage performance, e.g., if short PRACH format (e.g., PRACH format B4 as specified in TS 38.211) is used. Given this, how to improve the coverage of the PRACH needs to be addressed.

According to some embodiments of the present application, the PRACH overage enhancement may be obtained by PRACH repetitions. The PRACH repetitions may refer to repeated PRACH preamble transmissions or transmitting the preamble in more than one RO, wherein each preamble transmission or transmitting the preamble in an RO may referred to a PRACH repetition. A PRACH repetition may also be referred to as a preamble repetition.

Depending on whether each repetition is transmitted using the same beam, the PRACH repetitions may be categorized as PRACH repetitions with same beams and PRACH repetitions with different beams.

In order to achieve the PRACH repetitions, at least the following issues need to be addressed.

How does a UE know the number of PRACH repetitions and the RO and preamble to be used for each repetition.

For PRACH repetitions with different beams, how does a UE know which beam should be used for transmitting the preamble in each RO.

For PRACH repetitions with different beams, how to let the UE know which one should be used for the following message transmission (e.g., Msg3) of RACH procedure.

Only a subset of UEs may support PRACH repetitions. How does a BS differentiate between UEs which support PRACH repetitions and the others UEs which do not support PRACH repetitions.

How to receive the RAR with PRACH repetitions.

Given the above, embodiments of the present application propose solutions for PRACH repetition, which can at least solve the above technical problems for implementing the PRACH repetition, thereby improving the coverage of the PRACH. More details on embodiments of the present application will be illustrated in the following text in combination with the appended drawings.

Figure 4:
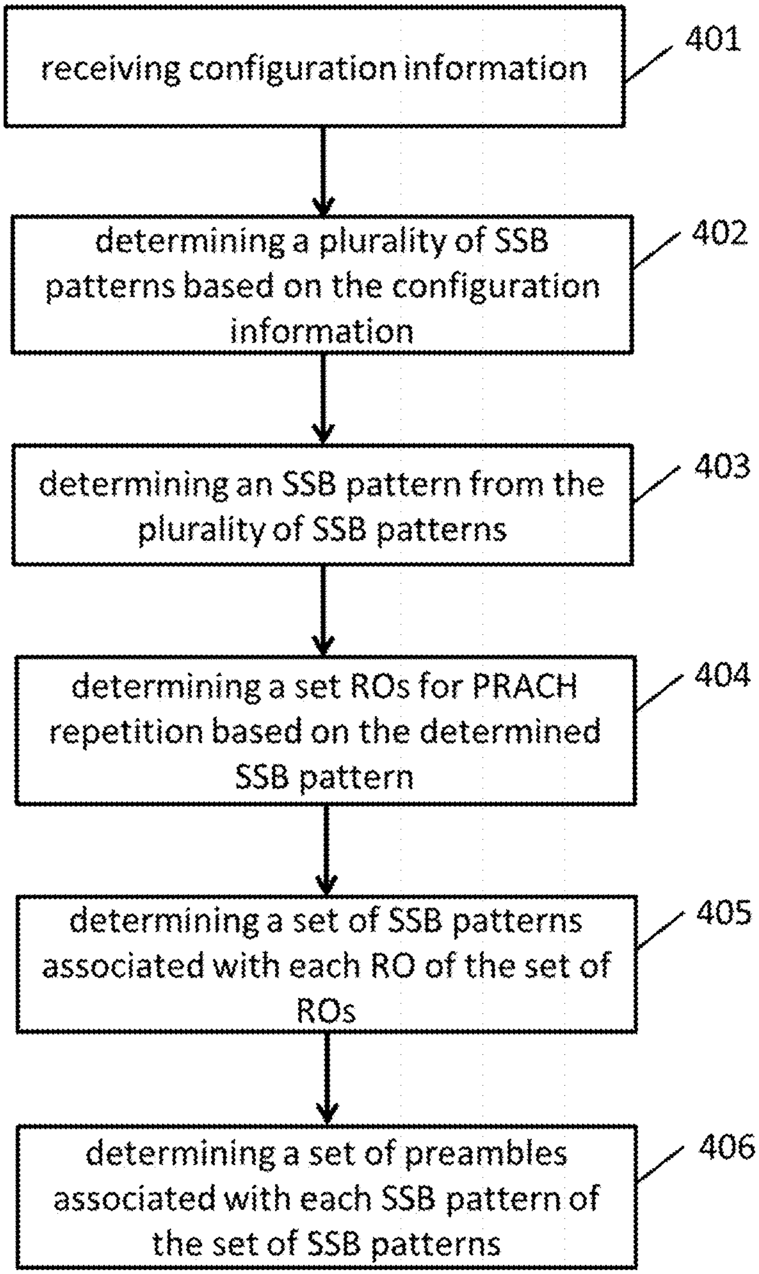
FIG. 4 is a flow chart illustrating an exemplary method for PRACH repetition according to some embodiments of the present application.

FIG. 4 is a flow chart illustrating an exemplary method for PRACH repetition according to some embodiments of the present application. The method in FIG. 4 may be implemented by a UE (e.g., UE 102*a* or UE 102*b* as shown in FIG. 1).

In the exemplary method shown in FIG. 4, in step 401, the UE may receive configuration information from a BS (e.g., BS 101 as shown in FIG. 1). In some embodiments of the present application, the configuration information may be received from a broadcast signaling or a UE specific signaling from the BS.

In some embodiments of the present application, the configuration information may include a plurality of SSB patterns for PRACH repetitions. Each SSB pattern may include one or more SSBs. The number of SSBs in a SSB pattern may be same with the number of PRACH repetitions (also referred to as a PRACH repetition number). The configuration information may include SSB patterns for one or more PRACH repetition numbers. For example, the configuration information may include four SSB patterns, which are {0,1,2,3}, {4,5,6,7}, {0,2,4,6}, and {1,3,5,7}. The numbers included in the SSB pattern may be the indexes of the SSBs. For example, for the SSB pattern {0,1,2,3}, it includes SSB #0, SSB #1, SSB #2, and SSB #3. Each SSB pattern in these SSB patterns contains four SSBs and thus corresponds to a PRACH repetition number which is equal to 4. The SSBs in a SSB pattern may be the same or different, which correspond to PRACH repetitions with same beam and PRACH repetitions with different beams, respectively.

In some other embodiments of the present application, the configuration information may include a set of offsets for determining the plurality of SSB patterns. For example, it is assumed that the set of offsets is {1,2} and the SSBs configured by the BS are {0,1,2,3}, then the plurality of SSB patterns may be {0,0+1}, {0,0+2}, {1,1+1}, {1,1+2}, {2,2+1}, {2,2+2}, {3,3+1}, {3,3+2}, i.e., the SSB patterns are determined by applying the configured offsets for each SSB. In some embodiments, for each PRACH prepetition number, there may be a corresponding set of offsets for the PRACH prepetition number.

Then, after receiving the configuration information, in step 402, the UE may determine the plurality of SSB patterns based on the configuration information. For example, in the case that the configuration information includes the plurality of SSB patterns, the UE may directly determine the plurality of SSB patterns. Alternatively, in the case that the configuration information includes the set of offsets, the UE may determine the plurality of SSB patterns based on the set of offsets, e.g., based on the methods as stated above.

In step 403, the UE may determine an SSB pattern from the plurality of SSB patterns. In some embodiments, the SSB pattern may be determined based on a measurement of a channel quality of SSB(s) included in each SSB pattern of the plurality of SSB patterns. For example, the UE may select an SSB pattern which includes SSB(s) having the best channel qualities. However, in some other embodiments, the SSB may be randomly selected from the plurality of SSB patterns by the UE or may be determined from the plurality of SSB patterns based on other criterion. For example, in the above embodiments, the UE may determine the SSB pattern is {1,3,5,7}. In some other embodiments, the UE may select one PRACH repetition number, and select one SSB pattern corresponding to the selected PRACH repetition number (e.g., selecting a SSB pattern wherein the number of SSBs included in the SSB pattern is equal to the selected PRACH repetition number) based on the measured channel quality.

In step 404, the UE may determine a set of ROs for PRACH repetition based on the determined SSB pattern.

In such embodiments, before determining the set of ROs, the UE may receive configuration information configuring a plurality of ROs for PRACH repetitions from the BS (in other words, the BS may configure a plurality of ROs for PRACH repetitions). In some embodiments, the plurality of ROs may be separately configured (e.g., dedicated for PRACH repetitions). In some other embodiments, the plurality of ROs may be shared by both the PRACH repetitions and PRACH transmission without repetition, e.g., both the PRACH repetition and the PRACH transmission without repetition can use the plurality of ROs.

In addition, the UE may also receive configuration information configuring the association between SSB and RO (e.g., the association may be 1-to-1 association as shown in FIG. 3A, N-to-1 association as shown in FIG. 3B, or 1-to-N association as shown in FIG. 3C) from the BS.

Then, the UE may determine the set of ROs from the plurality of ROs based on the determined SSB pattern. Specifically, an RO of the plurality of ROs is in the set of ROs for repetition if the RO is associated with the determined SSB pattern (e.g., associated with an SSB in the determined SSB pattern), wherein the association between SSB and RO is configured by the BS. For example, it is assumed that the determined SSB pattern is {1,3,5,7}, the ROs for PRACH repetitions are RO #0 to RO #8 as shown in FIG. 2A, and the association between SSB and RO is 1-to-1 association as shown in FIG. 2A, then UE may determine that the set of ROs includes RO #1, RO #3, RO #5, and RO #7.

In some embodiments of the present application, the set of ROs are determined from a start of an SSB to RO mapping cycle, or from a start of an SSB to RO association period, or from a start of an SSB to RO association pattern period. The SSB to RO association period may include one or more SSB to RO mapping cycles. The SSB to RO association pattern period may include one or more SSB to RO association periods. In some embodiments, the PRACH repetitions are within a SSB to RO mapping cycle, or a SSB to RO association period, or a SSB to RO association pattern period.

In some embodiments of the present application, the ROs included in the set of ROs for PRACH repetitions may not be frequency-multiplexed, otherwise the preamble in each repetition cannot be transmitted by using full power. Therefore, when the plurality of ROs are configured via a frequency division multiplexing (FDM) manner (e.g., the plurality of ROs are FDMed ROs), the ROs in the set of ROs determined by the UE cannot have the same position in the time domain.

In some embodiments of the present application, the association between SSB and RO may be a 1-to-N association and each SSB may be associated with FDMed ROs. In such embodiments, to ease the implementation, the set of ROs determined by the UE based on the determined SSB pattern may have the same position in the frequency domain. In some other embodiments of the present application, the association between SSB and RO may be a 1-to-N association and each SSB may be associated with ROs which are not FDMed ROs. In such embodiments, the set of ROs determined by the UE based on the determined SSB pattern may have the same relative position in the time domain. For example, for 1-to-2 SSB to RO association without FDMed ROs, where one SSB is associated with 2 TDMed ROs, if the determined SSB pattern is {0,1}, then the ROs for PRACH repetitions may be either the first RO associated with SSB #0 and the first RO associated with SSB #1, or the second RO associated with SSB #0 and the second RO associated with SSB #1.

Figure 5:
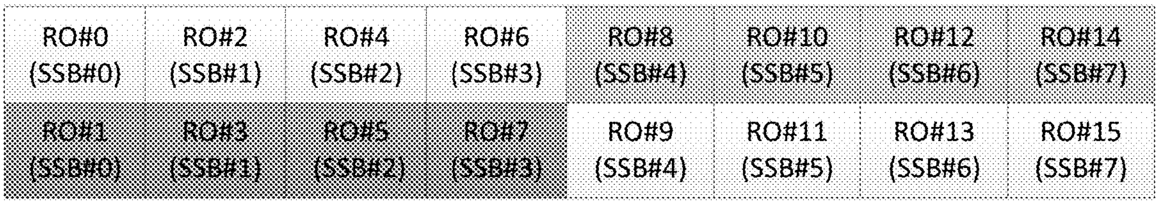
FIG. 5 illustrates an exemplary RO selection method according to some embodiments of the present application.

FIG. 5 illustrates an exemplary RO selection method according to some embodiments of the present application.

In the embodiments of FIG. 5, it is assumed that there are 8 SSBs indexed with SSB #0 to SSB #7 and the association between SSB and RO is 1-to-2 association. Moreover, it is assumed that the association period includes 16 ROs indexed with RO #0 to RO #15 and each SSB are associated with two FDMed ROs, i.e., SSB #0 may be associated with RO #0 and RO #1, SSB #1 may be associated with RO #2 and RO #3, SSB #2 may be associated with RO #4 and RO #5, SSB #3 may be associated with RO #6 and RO #7, SSB #4 may be associated with RO #8 and RO #9, SSB #5 may be associated with RO #10 and RO #11, SSB #6 may be associated with RO #12 and RO #13, SSB #7 may be associated with RO #14 and RO #15.

Assuming that UE1 determines an SSB pattern {0,1,2,3}, then, to ease the implementation, the UE1 may determine the set of ROs to the same position in the frequency domain based on the SSB pattern {0,1,2,3}, for example, the UE1 may determine the set of ROs to be {1,3,5,7}.

Assuming that UE2 determines an SSB pattern {4,5,6,7}, then, to ease the implementation, the UE2 may determine the set of ROs to the same position in the frequency domain based on the SSB pattern {4,5,6,7}, for example, the UE2 may determine the set of ROs to be {8, 10,12,14}.

In step 405, the UE may determine, from the plurality of SSB patterns, a set of SSB patterns associated with each RO of the set of ROs. The set of SSB patterns may include the determined SSB pattern. In such embodiments, the UE may determine an SSB pattern to be associated with an RO of the set of ROs in the case that the SSB pattern includes an SSB associated with the RO.

For example, it is assumed that: the configuration information may include four SSB patterns which are {0,1,2,3}, {4,5,6,7}, {0,2,4,6}, and {1,3,5,7}, and the UE determines an SSB pattern {1,3,5,7}. Moreover, it is assumed that the association between SSB and RO is 1-to-1 association as shown in FIG. 2A, then UE may determine that the set of ROs includes RO #1, RO #3, RO #5, and RO #7.

Then, for RO #1, it may be associated with SSB #1, and thus the UE may determine SSB patterns {0,1,2,3} and {1,3,5,7} are associated with the RO #1 because SSB #1 is included in both the two patterns. Similarly, for RO #3, it may be associated with SSB #3, and thus the UE may determine SSB patterns {0, 1,2,3} and {1,3,5,7} are associated with the RO #3 because SSB #3 is included in both the two patterns; for RO #5, it may be associated with SSB #5, and thus the UE may determine SSB patterns {4,5,6,7} and {1,3,5,7} are associated with the RO #5 because SSB #5 is included in both the two patterns; for RO #7, it may be associated with SSB #7, and thus the UE may determine SSB patterns {4,5,6,7} and {1,3,5,7} are associated with the RO #7 because SSB #7 is included in both the two patterns.

In step 406, for each RO of the set of ROs, the UE may determine a set of preambles associated with each SSB pattern of the set of SSB patterns. For example, in the above example, for RO #1 associated with {0,1,2,3} and {1,3,5,7}, the UE may determine a set of preambles associated with SSB pattern {0,1,2,3} and a set of preambles associated with SSB pattern {1,3,5,7}.

Before determining a set of preambles associated with each SSB pattern of the set of SSB patterns, the UE may obtain a plurality of preambles for PRACH repetitions based on network's configuration, e.g., the UE may receive configuration information indicating a plurality of preambles for PRACH repetitions from the BS. In some embodiments, the set of ROs may be dedicated for the PRACH repetitions, then the plurality of preambles may be dedicated for PRACH transmission with repetition. In some other embodiments, the set of ROs may be shared by PRACH repetitions and PRACH transmission without repetition, then the plurality of preambles for PRACH repetitions may be a set of contention-free preambles for UEs without PRACH repetition.

Figure 6:
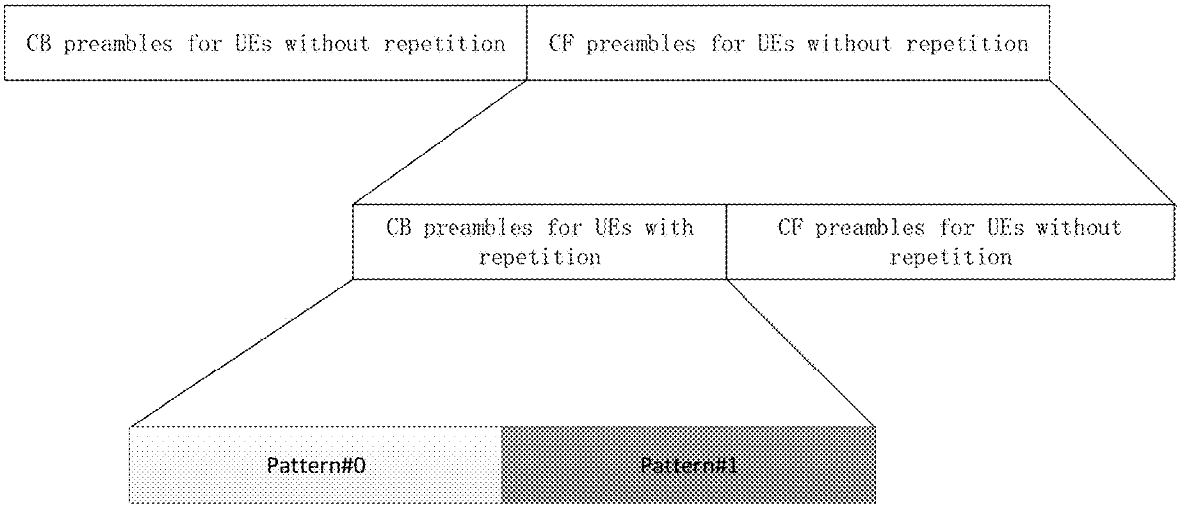
FIG. 6 illustrates exemplary preambles for PRACH repetition according to some embodiments of the present application.

FIG. 6 illustrates exemplary preambles for PRACH repetition according to some embodiments of the present application.

Referring to FIG. 6, it is assumed that the preambles for UEs without PRACH repetition are categorized into two kinds of preambles, one kind is contention-based (CB) preambles for preambles for UEs without PRACH repetition and the other kind is contention-free (CF) preambles for UEs without PRACH repetition. Then, a portion of CF preambles may be used for the plurality of preambles for PRACH repetitions (e.g., used as CB preambles for UEs with PRACH repetition), and the remaining portion of the CF preambles may be used for the CF preambles for UEs without PRACH repetition. In other words, the BS may configure a portion of CF preambles for UEs without PRACH repetition to be the plurality of preambles for PRACH repetitions, and the plurality of preambles may be used for the set of SSB patterns, e.g., including SSB pattern #0 and SSB pattern #1 in the example of FIG. 6.

After obtaining the plurality of preambles for PRACH repetitions, in order to determine a set of preambles associated with each SSB pattern of the set of SSB patterns, the UE may partition the plurality of preambles for the set of SSB patterns into a plurality of sets of preambles. The number of the plurality of sets of preambles may be the same as the number of SSB patterns included in the set of SSB patterns.

For example, it is assumed that the plurality of preambles for PRACH repetitions includes N preambles (wherein N is an integer larger than 1) indexed with #0 to #N−1 and the set of SSB patterns include K SSB patterns (wherein K is an integer larger than 0), the UE may divide the N preambles into K sets, wherein the first set may include the preambles {0, . . . , N/K−1}, the second set may include preambles {N/K, . . . 2N/K−1}, etc.

In the above embodiments, partitioning preambles for different SSB patterns may avoid preamble collision from different UEs using different SSB patterns. In addition, partitioning preambles for UEs with and without PRACH repetition may avoid preamble collision from different types of UEs. For example, non-collided preambles from different type of UEs are beneficial for the BS to receive the preambles such that the BS may determine the type of the UE.

The UE may order the SSB pattern(s) in the set of SSB patterns, such that the set of preambles associated with each SSB pattern of the set of SSB patterns is determined from the plurality of sets of preambles based on an order of each SSB pattern in the set of SSB patterns.

For example, it is assumed that the plurality of preambles are {0, . . . , 15}, and the set of SSB patterns includes SSB pattern {0,1,2,3} and SSB pattern {1,3,5,7}. Then, the UE may partition preambles {0, . . . , 15} into two sets of preambles, i.e., preambles {0, . . . , 7} and preambles {8, . . . , 15}, the UE may order the SSB patterns and the ordered SSB patterns are {0, 1,2,3} and {1,3,5,7} (e.g., the indexes for the two SSB patterns in the set of SSB patterns are pattern #0 and pattern #1). Consequently, the UE may determine that the first set of preambles {0, . . . , 7} is associated with the pattern #0 (i.e., SSB pattern {0,1,2,3})

and the second set of preambles {8, . . . , 15} is associated with pattern #1 (i.e., the SSB pattern {1,3,5,7}).

According to some embodiments of the present application, there are two SSB pattern ordering schemes that may be used.

One ordering scheme is a unified ordering scheme in each RO of the set of ROs. In the unified ordering scheme, for each RO of the set of ROs, the SSB pattern(s) in the set of SSB patterns associated with the RO are ordered based on the same ordering scheme.

In some embodiments of the present application, the same ordering scheme may include: ordering the SSB pattern(s) in the set of SSB patterns associated with an RO according to orders of the SSB pattern(s) in the plurality of SSB patterns; and then ordering the ordered SSB pattern(s) based on an increasing order of index(es) of SSB(s) associated with the RO. In other words, the same ordering scheme may include: firstly ordering the SSB pattern(s) in the set of SSB patterns associated with an RO according to order of the SSB pattern(s) in the plurality of SSB patterns; and secondly ordering the ordered SSB pattern(s) based on an increasing order of index(es) of SSB(s) associated with the RO.

In some embodiments of the present application, the same ordering scheme may include: firstly ordering the SSB pattern(s) of a first SSB in the set of SSB patterns associated with an RO according to order of the SSB pattern(s) of the first SSB in the plurality of SSB patterns; and secondly ordering the SSB pattern(s) based on an increasing order of index(es) of SSB(s) associated with the RO. The first SSB may be an SSB associated with the RO and with lowest index. The SSB pattern(s) of the first SSB are those contain the first SSB.

In some cases, it is desirable that the preambles for a same SSB pattern in repeated ROs are same (i.e., same index of the SSB pattern in repeated ROs), so that the UE could transmit a same preamble in each repetition. The unified ordering may or may not achieve this principle. Then embodiments of the present application propose another SSB pattern ordering scheme, i.e., differential SSB pattern ordering in each RO of the set of ROs.

In some embodiments of the present application, the differential ordering scheme includes ordering SSB pattern(s) in a set of SSB patterns associated with a latter RO based on order(s) of SSB pattern(s) in a set of SSB patterns associated with former RO(s). In such embodiments, for an SSB pattern associated with both a former RO and the latter RO, the UE may determine an order of the SSB pattern (e.g., an index of the SSB pattern) in a set of SSB patterns associated with the latter RO to be the same as an order of the SSB pattern (e.g., an index of the SSB pattern) in a set of SSB patterns associated with former RO.

For example, the differential ordering scheme may include the following operations:

For the first RO of a plurality of ROs configured for the UE, firstly ordering the SSB pattern(s) of a first SSB in the set of SSB patterns associated with the first RO according to orders of the SSB pattern(s) in the plurality of SSB patterns; and secondly ordering the SSB pattern(s) based on an increasing order of index(es) of SSB(s) associated with the first RO.

For the second RO, if it has the same associated SSB pattern(s) as the first RO, then these SSB pattern(s) associated with the second RO have the same index(es) (e.g., orders) as those associated with first RO. For the other SSB pattern(s), they are ordered based on same schemes for the first RO.

For the third RO, if it has the same associated SSB pattern(s) as the first RO and the second RO, then these SSB pattern(s) associated with the third RO have the same index(es) (e.g., orders) as those associated with first RO and the second RO. For the other SSB pattern(s), they are ordered based on same schemes for the first RO.

The above principle may be repeated for the remaining ROs of the plurality of ROs.

After determining a set of preambles associated with each SSB pattern of the set of SSB patterns (the set of SSB patterns includes the determined SSB pattern) associated with each RO of the set of ROs, the UE may select a preamble from a set of preambles associated with the determined SSB pattern.

In some embodiments of the present application, the UE may transmit the preamble in each RO of the set of ROs.

In some other embodiments of the present application, after a time gap relative to a transmission of the preamble in a first RO of the set of ROs, the UE may start a RAR window. In the case that an RAR is received in the RAR window before the UE finishing transmitting the preamble in all ROs of the set of ROs, the UE may terminate transmitting the preamble in the remaining ROs.

In the above embodiments, for an RO of the set of ROs, the preamble is transmitted using the beam corresponding to an SSB which is included in the determined SSB pattern and associated with the RO. This is enabled since the SSB pattern for PRACH repetition includes the SSB that is associated with the RO. For example, in is assumed that the determined SSB pattern for PRACH repetitions is SSB pattern {a,b}, then, for an RO associated with SSB #a, the UE may transmit the preamble by using the beam corresponding to SSB #a.

In some embodiments of the present application, after transmitting the preamble (e.g., in a portion of ROs or in all ROs of the set of ROs), the UE may receive DCI scheduling an RAR. The DCI may be associated (e.g., scrambled) with by an RA-RNTI, which is determined by at least one of the time position or the frequency position of an RO of ROs for transmitting the preamble. From the UE's perspective, the UE needs to perform blind detection of RA-RNTIs determined by each RO of ROs for transmitting the preamble and determines the RA-RNTI associated with the DCI. In an embodiment of the present application, the RO for determining the RA-RNTI may be an RO with a best channel quality in ROs for transmitting the preamble.

After determining the RA-RNTI associated with the DCI scheduling the RAR, the UE may determine a beam for transmitting messages after preamble transmission (e.g., Msg3) based on the determined RA-RNTI.

In the above embodiments in FIG. 4, the UE may determine a set of SSB patterns associated with each RO of the set of ROs in step 405, and then perform SSB pattern ordering and the preamble partitioning for each RO of the set of ROs in step 406. However, according to some other embodiments of the present application, the UE may determine a set of SSB patterns only associated with a first RO (e.g., RO #1 as in the above example) of the set of ROs in step 405, and then perform SSB pattern ordering and the preamble partitioning for the first RO (e.g., RO #1 as in the above example) in step 406. After that, the UE may select a preamble based on the partitioning for the first RO, and then transmit the same preamble in each repeated RO (e.g., RO #1, #3, #5, #7).

Figure 7:
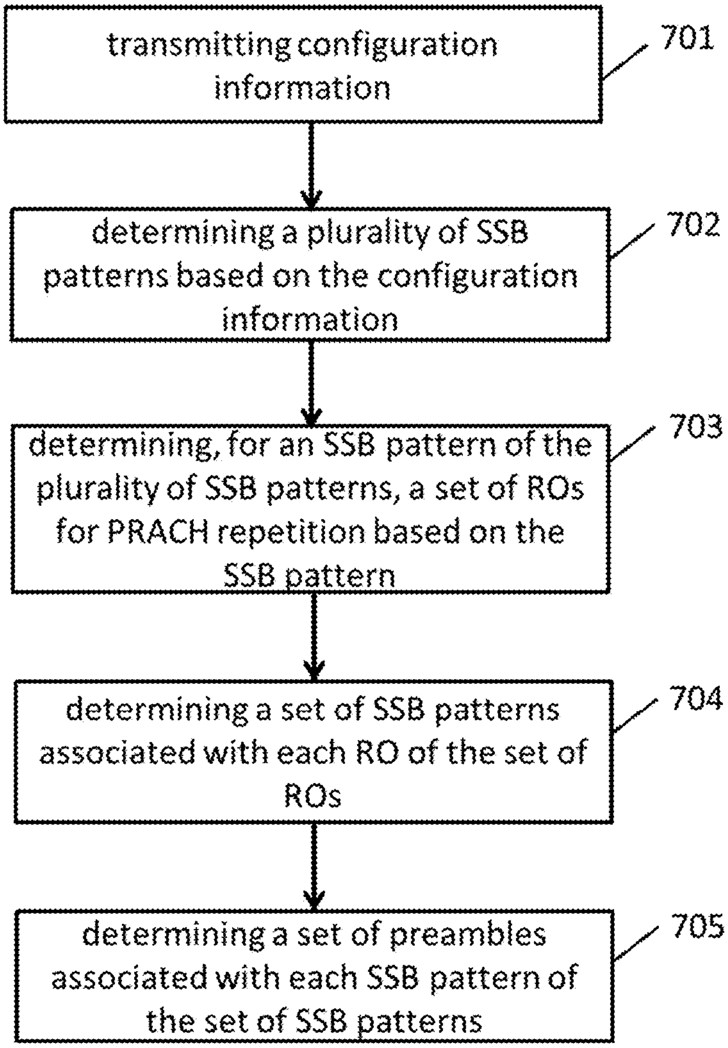
FIG. 7 is a flow chart illustrating another exemplary method for PRACH repetition according to some other embodiments of the present application.

FIG. 7 is a flow chart illustrating another exemplary method for PRACH repetition according to some other embodiments of the present application. The method in FIG. 4 may be implemented by a BS (e.g., BS 101 as shown in FIG. 1).

In the exemplary method shown in FIG. 7, in step 701, the BS may transmit configuration information to at least one UE (e.g., UE 102*a* and UE 102*b* as shown in FIG. 1). The configuration information in FIG. 7 may be the same as that in FIG. 4. The configuration information may be transmitted in a broadcast signaling or a UE specific signaling.

In some embodiments of the present application, the configuration information may include a plurality of SSB patterns for PRACH repetitions. Each SSB pattern may include one or more SSBs.

In some other embodiments of the present application, the configuration information may include a set of offsets for determining the plurality of SSB patterns.

In step 702, the BS may determine the plurality of SSB patterns based on the configuration information.

In step 703, for an SSB pattern of the plurality of SSB patterns, the BS may determine a set of ROs for PRACH repetition based on the SSB pattern. Specifically, for an SSB pattern, the BS may use the same methods as those used in FIG. 4 to determine a set of RO associated with the SSB pattern. The SSB pattern may be any SSB pattern of the plurality of SSB patterns.

Specifically, before determining the set of ROs, the BS may transmit configuration information configuring a plurality of ROs for PRACH repetitions to the at least one UE (in other words, the BS may configure a plurality of ROs for PRACH repetitions). In some embodiments, the plurality of ROs may be separately configured (e.g., dedicated for PRACH repetitions). In some other embodiments, the plurality of ROs may be shared by both the PRACH repetitions and PRACH transmission without repetition, e.g., both the PRACH repetition and the PRACH transmission without repetition can use the plurality of ROs.

In addition, the BS may also transmit configuration information configuring the association between SSB and RO (e.g., the association may be 1-to-1 association as shown in FIG. 3A, N-to-1 association as shown in FIG. 3B, or 1-to-N association as shown in FIG. 3C) to the at least one UE.

Then, the BS may determine the set of ROs from the plurality of ROs based on the SSB pattern. Specifically, an RO of the plurality of ROs is in the set of ROs if the RO is associated with the SSB pattern (e.g., associated with an SSB in the SSB pattern), wherein the association between SSB and RO is configured by the BS.

In some embodiments of the present application, the set of ROs are determined from a start of an SSB to RO mapping cycle, or from a start of an SSB to RO association period, or from a start of an SSB to RO association pattern period.

In some embodiments of the present application, the ROs included in the set of ROs for PRACH repetitions may not be frequency-multiplexed, otherwise the preamble in each repetition cannot be transmitted by using full power. Therefore, when the plurality of ROs are configured via a frequency division multiplexing (FDM) manner (e.g., the plurality of ROs are FDMed ROs), the ROs in the set of ROs determined by the BS cannot have the same position in the time domain.

In some embodiments of the present application, the association between SSB and RO may be a 1-to-N association and each SSB may be associated with FDMed ROs. In such embodiments, to ease the implementation, the set of ROs determined by the BS based on the determined SSB pattern may have the same position in the frequency domain. The specific determining method performed by the BS may be referred to FIG. 5, e.g., for SSB pattern {0,1,2,3}, for SSB pattern {4,5,6,7}, the BS may determine the set of ROs to be {8,10, 12,14}.

In some other embodiments of the present application, the association between SSB and RO may be a 1-to-N association and each SSB may be associated with ROs which are not FDMed ROs. In such embodiments, the set of ROs determined by the BS based on the determined SSB pattern may have the same relative position in the time domain. For example, for 1-to-2 SSB to RO association without FDMed ROs, where one SSB is associated with 2 TDMed ROs, if the determined SSB pattern is {0,1}, then the ROs for PRACH repetitions may be either the first RO associated with SSB #0 and the first RO associated with SSB #1, or the second RO associated with SSB #0 and the second RO associated with SSB #1.

In step 704, the BS may determine, from the plurality of SSB patterns, a set of SSB patterns associated with each RO of the set of ROs. The set of SSB patterns may include the SSB pattern. Specifically, the BS may use the same methods as those used in FIG. 4 to determine a set of SSB patterns associated with each RO of the set of ROs. For example, the BS may determine an SSB pattern to be associated with an RO of the set of ROs in the case that the SSB pattern includes an SSB associated with the RO.

In step 705, for each RO of the set of ROs, the BS may determine a set of preambles associated with each SSB pattern of the set of SSB patterns. Specifically, the BS may use the same methods as those used in FIG. 4 to determine a set of preambles associated with each SSB pattern of the set of SSB patterns.

For example, before determining a set of preambles associated with each SSB pattern of the set of SSB patterns, the BS may configure a plurality of preambles for PRACH repetitions to the at least UE. In some embodiments, the set of ROs may be dedicated for the PRACH repetitions, then the plurality of preambles may be shared by PRACH repetitions and PRACH transmission without repetition.

In some other embodiments, the set of ROs may be shared by PRACH repetitions and PRACH transmission without repetition, then the plurality of preambles for PRACH repetitions may be a set of contention-free preambles for UEs without PRACH repetition. The specific embodiment regarding the plurality of preambles for PRACH repetitions may be referred to FIG. 6.

The BS may partition the plurality of preambles for the set of SSB patterns into a plurality of sets of preambles. The number of the plurality of sets of preambles may be the same as the SSB patterns included in the set of SSB patterns. The BS may use the same methods as those used in FIG. 4 to partition the plurality of preambles.

The BS may order the SSB pattern(s) in the set of SSB patterns, such that the set of preambles associated with each SSB pattern of the set of SSB patterns is determined from the plurality of sets of preambles based on an order of each SSB pattern in the set of SSB patterns. The BS may use the same methods as those used in FIG. 4 to order the SSB pattern(s) in the set of SSB patterns.

For example, there are two SSB pattern ordering schemes that may be used by the BS.

One ordering scheme is a unified ordering scheme in each RO of the set of ROs. In the unified ordering scheme, for each RO of the set of ROs, the SSB pattern(s) in the set of SSB patterns associated with the RO are ordered based on the same ordering scheme.

In some embodiments of the present application, the same ordering scheme may include: ordering the SSB pattern(s) in the set of SSB patterns associated with an RO according to orders of the SSB pattern(s) in the plurality of SSB patterns; and then ordering the ordered SSB pattern(s) based on an increasing order of index(es) of SSB(s) associated with the RO. In other words, the same ordering scheme may include: firstly ordering the SSB pattern(s) in the set of SSB patterns associated with an RO according to orders of the SSB pattern(s) in the plurality of SSB patterns; and secondly ordering the ordered SSB pattern(s) based on an increasing order of index(es) of SSB(s) associated with the RO.

In some embodiments of the present application, the same ordering scheme may include: firstly ordering the SSB pattern(s) of a first SSB in the set of SSB patterns associated with an RO according to order of the SSB pattern(s) of the first SSB in the plurality of SSB patterns; and secondly ordering the SSB pattern(s) based on an increasing order of index(es) of SSB(s) associated with the RO. The first SSB may be an SSB associated with the RO and with lowest index. The SSB pattern(s) of the first SSB are those contain the first SSB.

Another ordering scheme is differential SSB pattern ordering in each RO of the set of ROs.

In some embodiments of the present application, the differential ordering scheme includes ordering SSB pattern(s) in a set of SSB patterns associated with a latter RO based on order(s) of SSB pattern(s) in a set of SSB patterns associated with former RO(s). In such embodiments, for an SSB pattern associated with both a former RO and the latter RO, the UE may determine an order of the SSB pattern (e.g., an index of the SSB pattern) in a set of SSB patterns associated with the latter RO to be the same as an order of the SSB pattern (e.g., an index of the SSB pattern) in a set of SSB patterns associated with former RO.

For example, the differential ordering scheme may include the following operations:

- For the first RO of a plurality of ROs configured for the UE, firstly ordering the SSB pattern(s) of a first SSB in the set of SSB patterns associated with the first RO according to orders of the SSB pattern(s) in the plurality of SSB patterns; and secondly ordering the SSB pattern(s) based on an increasing order of index(es) of SSB(s) associated with the first RO.
- For the second RO, if it has the same associated SSB pattern(s) as the first RO, then these SSB pattern(s) associated with the second RO have the same index(es) (e.g., orders) as those associated with first RO. For the other SSB pattern(s), they are ordered based on same schemes for the first RO.
- For the third RO, if it has the same associated SSB pattern(s) as the first RO and the second RO, then these SSB pattern(s) associated with the third RO have the same index(es) (e.g., orders) as those associated with first RO and the second RO. For the other SSB pattern (s), they are ordered based on same schemes for the first RO.
- The above principle may be repeated for the remaining ROs of the plurality of ROs.

After determining a set of preambles associated with each SSB pattern of the set of SSB patterns (the set of SSB patterns includes the determined SSB pattern) associated with each RO of the set of ROs, in step 706, the BS may monitor each preamble from a set of preambles associated with the SSB pattern in each RO of the set of ROs.

In some embodiments of the present application, the BS may receive a preamble of the set of preambles in each RO of the set of ROs from a UE of the at least one UE.

In some other embodiments of the present application, after a time gap relative to a reception of the preamble in a first RO of the set of ROs, the BS may start a RAR window. In the case that an RAR is transmitted in the RAR window before the BS finishing receiving the preamble in all ROs of the set of ROs, the BS may terminate receiving the preamble in the remaining ROs.

In the above embodiments, for an RO of the set of ROs, the preamble is received using the beam corresponding to an SSB which is included in the determined SSB pattern and associated with the RO.

In some embodiments of the present application, after receiving the preamble (e.g., in a portion of ROs or in all ROs of the set of ROs), the BS may transmit DCI scheduling an RAR to the UE. The DCI may be associated (e.g., scrambled) with by an RA-RNTI, which is determined by at least one of the time position or the frequency position of an RO of ROs for receiving the preamble. In an embodiment of the present application, the RO for determining the RA-RNTI may be an RO with a best channel quality in ROs for receiving the preamble.

In the above embodiments in FIG. 7, the BS may determine a set of SSB patterns associated with each RO of the set of ROs in step 704, and then perform SSB pattern ordering and the preamble partitioning for each RO of the set of ROs in step 705. However, according to some other embodiments of the present application, the BS may determine a set of SSB patterns only associated with a first RO of the set of ROs in step 704, and then perform SSB pattern ordering and the preamble partitioning for the first RO in step 705. After that, in step 706, the BS may monitor each preamble from a set of preambles associated with the SSB pattern in each RO of the set of ROs in step 706.

Although the embodiments of FIG. 7 takes an SSB pattern as an example, in some other embodiments of the present application, for each SSB pattern of the plurality of SSB patterns, the BS may determine a set of ROs for PRACH repetition based on the corresponding SSB pattern. In such embodiments, for each SSB pattern of the plurality of SSB patterns, the BS may perform steps 703 to 706 and the steps after 706 in FIG. 7.

Figure 8:
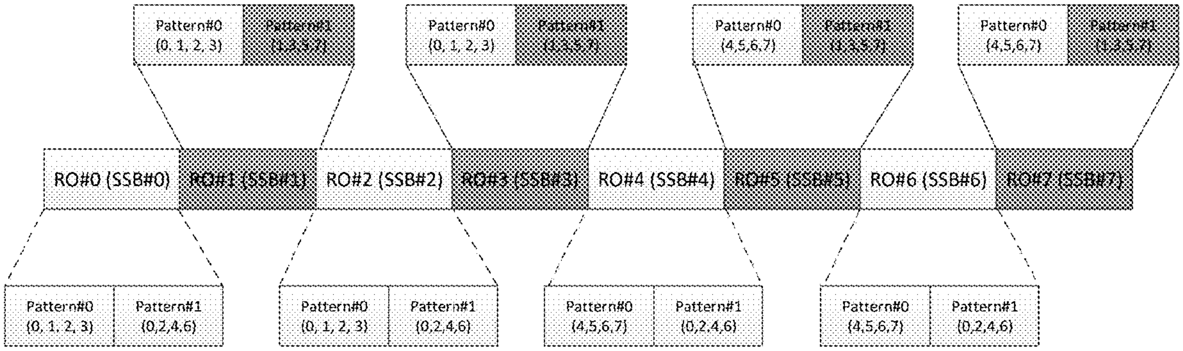
FIG. 8 illustrates an exemplary RO selection and preamble partitioning method according to some embodiments of the present application.

FIG. 8 illustrates an exemplary RO selection and preamble partitioning method according to some embodiments of the present application.

Referring to FIG. 8, it is assumed that:

- there are 8 SSBs indexed with SSB #0 to SSB #7 and 8 ROs indexed with RO #0 to RO #7 configured for the UE;
- the association between SSB and RO is 1-to-1 association.
- the configuration information include four SSB patterns for PRACH repetitions, which are {0,1,2,3}, {4,5,6,7}, {0,2,4,6}, and {1,3,5,7}, implying that PRACH repetition number is 4.

From the UE's perspective, the UE may determine an SSB pattern, e.g., SSB pattern {1,3,5,7} from the four SSB patterns. Based on the determined SSB pattern {1,3,5,7}, the UE may determine a set of ROs for PRACH repetitions to be ROs {1,3,5,7}.

Then, for each RO of ROs {1,3,5,7}, the UE may determine a set of SSB patterns associated with RO. For example, for RO #1, the UE may determine SSB patterns {0,1,2,3} and {1,3,5,7} are associated with the RO #1 because SSB #1 is included in both the two patterns; for RO #3, the UE may determine SSB patterns {0,1,2,3} and {1,3,5,7} are associated with the RO #3 because SSB #3 is included in both the two patterns; for RO #5, the UE may determine SSB patterns {4,5,6,7} and {1,3,5,7} are associated with the RO #5 because SSB #5 is included in both the two patterns; for RO #7, the UE may determine SSB patterns {4,5,6,7} and {1,3,5,7} are associated with the RO #7 because SSB #7 is included in both the two patterns.

Then, for each RO of the set of ROs, the UE may determine a set of preambles associated with each SSB pattern in the set of SSB patterns.

In the example of FIG. 8, for each RO, the SSB patterns in the set of SSB patterns may be ordered based on the same ordering scheme, i.e., firstly ordering the SSB pattern(s) in the set of SSB patterns associated with an RO according to orders of the SSB pattern(s) in the plurality of SSB patterns; and secondly ordering the ordered SSB pattern(s) based on an increasing order of index(es) of SSB(s) associated with the RO. Taking RO #1 as an example, the SSB patterns {0,1,2,3} and {1,3,5,7} may be firstly ordered according to orders of the SSB pattern(s) in the plurality of SSB patterns, i.e., the SSB patterns {0,1,2,3} may be the first pattern (e.g., pattern #0) in the set of SSB patterns and {1,3,5,7} may be the second pattern (e.g., pattern #1) in the set of SSB patterns. Since the two SSB patterns only includes an SSB (e.g., SSB #1) associated with RO #1, the operation regarding secondly ordering does not need to be performed. For other ROs, the UE may perform the same operation with RO #1.

The SSB pattern ordering may also be achieved by firstly ordering the SSB pattern(s) of a first SSB in the set of SSB patterns associated with an RO according to order of the SSB pattern(s) of the first SSB in the plurality of SSB patterns; and secondly ordering the SSB pattern(s) based on an increasing order of index(es) of SSB(s) associated with the RO. Still taking RO #1 as an example, since only SSB #1 is associated with RO #1, the first SSB is SSB #1. The SSB patterns {0,1,2,3} and {1,3,5,7} may be firstly ordered according to orders of the SSB pattern(s) in the plurality of SSB patterns, i.e., the SSB patterns {0,1,2,3} may be the first pattern (e.g., pattern #0) in the set of SSB patterns and {1,3,5,7} may be the second pattern (e.g., pattern #1) in the set of SSB patterns. Since the two SSB patterns only includes an SSB (e.g., SSB #1) associated with RO #1, the operation regarding secondly ordering does not need to be performed. For other ROs, the UE may perform the same operation with RO #1.

It is assumed that the plurality of preambles are {0, . . . , 15}. Then, for RO #1, the UE may partition preambles {0, . . . , 15} into two sets of preambles, i.e., preambles {0, . . . , 7} and preambles {8, . . . , 15}. Based on the ordered SSB patterns, the UE may determine that the first set of preambles {0, . . . , 7} is associated with the pattern #0 (i.e., SSB pattern {0,1,2,3}) and the second set of preambles {8, . . . , 15} is associated with pattern #1 (i.e., the SSB pattern {1,3,5,7}). For other ROs, the UE may perform the same operation with RO #1.

Then, the UE may select a preamble from preambles {8, . . . , 15} which is associated with the determined SSB pattern {1,3,5,7}, and transmit the preamble in each of ROs #1, #3, #5, and #7. For each RO, the UE may transmit the preamble by using the beam corresponding to the SSB which is included in the determined SSB pattern and associated with the RO. For example, for RO #1, the UE may transmit the preamble in RO #1 by using the beam corresponding to SSB #1 because SSB #1 is included in the determined SSB pattern and associated with the RO #1.

In another example, the UE may determine a set of SSB patterns only associated with the first RO (i.e., RO #1 as in the above example), and perform the SSB pattern ordering and the preamble partitioning only for the first RO (i.e., RO #1 as in the above example) for the PRACH repetition. The UE may select a preamble based on the partitioning, and transmit the same preamble in each repeated RO (i.e., RO #1, #3, #5, #7).

From the BS' perspective, for each SSB pattern of SSB patterns {0,1,2,3}, {4,5,6,7}, {0,2,4,6}, and {1,3,5,7}, the BS may perform the same methods as those performed by the UE. Consequently, for each RO of the 8 ROs, the BS may determine a set of SSB patterns associated with the RO, which is illustrated in FIG. 8. Then, for each RO, the BS may determine a set of preambles associated with each SSB pattern of the set of SSB patterns associated with the RO based on the same method used by the UE.

Figure 9:
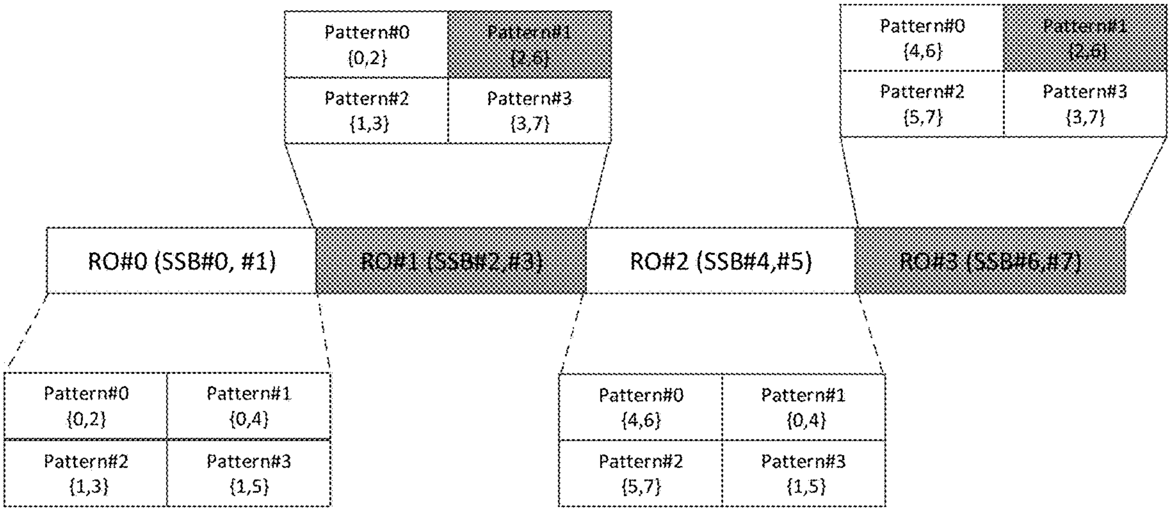
FIG. 9 illustrates an exemplary RO selection and preamble partitioning method according to some other embodiments of the present application.

FIG. 9 illustrates an exemplary RO selection and preamble partitioning method according to some other embodiments of the present application.

Referring to FIG. 9, it is assumed that:

- there are 8 SSBs indexed with SSB #0 to SSB #7 and 4 ROs indexed with RO #0 to RO #3 configured for the UE;
- the association between SSB and RO is 2-to-1 association.
- the configuration information include eight SSB patterns for PRACH repetitions, which are {0,2}, {4,6}, {1,3}, {5,7}, {0,4}, {1,5}, {2,6}, {3,7}, implying that the PRACH repetition number is 2.

For the UE's perspective, based on the above association, the UE may determine that SSB #0 and SSB #1 are associated with RO #0, SSB #2 and SSB #3 are associated with RO #1, SSB #4 and SSB #5 are associated with RO #2, and SSB #6 and SSB #7 are associated with RO #3.

The UE may determine an SSB pattern, e.g., SSB pattern {2,6} from the eight SSB patterns. Based on the determined SSB pattern {2,6}, the UE may determine a set of ROs for PRACH repetitions to be ROs {1,3} because SSB #2 is associated with RO #1 and SSB #6 is associated with RO #3.

Then, for each RO of ROs {1,3}, the UE may determine a set of SSB patterns associated with RO. For example, for RO #1, the UE may determine SSB patterns {0,2}, {1,3}, {2,6}, {3,7} are associated with the RO #1 because SSB #2 and SSB #3 are included in the above four patterns; for RO #3, the UE may determine SSB patterns {4,6}, {5,7}, {2,6}, {3,7} are associated with the RO #3 because SSB #6 and SSB #7 are included in the above four patterns.

Then, for an RO of the set of ROs, the UE may determine a set of preambles associated with each SSB pattern in the set of SSB patterns.

In the example of FIG. 9, for each RO, the SSB patterns in the set of SSB patterns may be ordered based on the same ordering scheme, i.e., firstly ordering the SSB pattern(s) in the set of SSB patterns associated with an RO according to orders of the SSB pattern(s) in the plurality of SSB patterns; and secondly ordering the ordered SSB pattern(s) based on an increasing order of index(es) of SSB(s) associated with the RO. Taking RO #1 as an example, the SSB patterns {0,2}, {1,3}, {2,6}, {3,7} may be firstly ordered according to orders of the SSB pattern(s) in the plurality of SSB patterns, i.e., the orders of the four SSB pattern(s) are SSB patterns {0,2}, {1,3}, {2,6}, {3,7} (in other words, the indexes of the SSB patterns {0,2}, {1,3}, {2,6}, {3,7} are pattern #0, pattern #1, pattern #2, and pattern #3, respectively). Then, the ordered SSB patterns {0,2}, {1,3}, {2,6}, {3,7} may be secondly ordered based on an increasing order of index(es) of SSB(s) associated with the RO #1. Since the SSBs associated with RO #1 are SSB #2 and SSB #3, the SSB pattern including SSB #2 may be ordered before the SSB pattern including SSB #3. Consequently, the final orders of the four SSB pattern(s) are SSB patterns {0,2}, {2,6}, {1,3}, {3,7} (in other words, the indexes of the SSB patterns {0,2}, {2,6}, {1,3}, {3,7} are pattern #0, pattern #1, pattern #2, and pattern #3, respectively). For other ROs, the UE may perform the same operation with RO #1.

The SSB pattern ordering may also be achieved by firstly ordering the SSB pattern(s) of a first SSB in the set of SSB patterns associated with an RO according to order of the SSB pattern(s) of the first SSB in the plurality of SSB patterns; and secondly ordering the SSB pattern(s) based on an increasing order of index(es) of SSB(s) associated with the RO. Still taking RO #1 as an example, since SSB #2 and SSB #3 are associated with RO #1, the first SSB is SSB #2 and the second SSB is SSB #3. The SSB patterns {0,2} and {2,6} may be firstly ordered according to orders of the SSB pattern(s) in the plurality of SSB patterns, i.e., the SSB patterns {0,2} may be the first pattern (e.g., pattern #0) in the set of SSB patterns and {2,6} may be the second pattern (e.g., pattern #1) in the set of SSB patterns. Then, the SSB patterns {1,3} and {3,7} may be secondly ordered based on an increasing order of index(es) of SSB(s) associated with the RO #1. The patterns {1,3}, {3,7} are then ordered as pattern #2 and pattern #3, respectively. For other ROs, the UE may perform the same operation with RO #1.

It is assumed that the plurality of preambles are {0, . . . , 15}. Then, for RO #1, the UE may partition preambles {0, . . . , 15} into four sets of preambles, i.e., preambles {0,1,2,3}, {4,5,6,7}, {8,9,10,11}, and {12,13,14, 15}. Based on the ordered SSB patterns, the UE may determine that the first set of preambles {0,1,2,3} is associated with the pattern #0 (i.e., SSB pattern {0,2}), the second set of preambles {4,5,6,7} is associated with pattern #1 (i.e., the SSB pattern {2,6}), the third set of preambles {8,9,10,11} is associated with pattern #2 (i.e., the SSB pattern {1,3}), and the fourth set of preambles {12,13, 14, 15} is associated with pattern #3 (i.e., the SSB pattern {3,7}). For other ROs, the UE may perform the same operation with RO #1.

Then, the UE may select a preamble from preambles {2,3} which is associated with the determined SSB pattern {2,6}, and transmit the preamble in each of ROs #1 and #3. For each RO, the UE may transmit the preamble by using the beam corresponding to the SSB which is included in the determined SSB pattern and associated with the RO. For example, for RO #1, the UE may transmit the preamble in RO #1 by using the beam corresponding to SSB #2 because SSB #2 is included in the determined SSB pattern and associated with the RO #1.

From the BS' perspective, for each SSB pattern of SSB patterns {0,2}, {4,6}, {1,3}, {5,7}, {0,4}, {1,5}, {2,6}, {3,7}, the BS may perform the same methods as those performed by the UE. Consequently, for each RO of the 4 ROs, the BS may determine a set of SSB patterns associated with the RO, which is illustrated in FIG. 9. Then, for each RO, the BS may determine a set of preambles associated with each SSB pattern of the set of SSB patterns associated with the RO based on the same method used by the UE.

In the above FIGS. 8 and 9, for each RO of the set of ROs, the SSB pattern(s) in the set of SSB patterns associated with the RO are ordered based on the unified SSB pattern ordering scheme. In some embodiments of the present application, it is desirable that the preambles for a same SSB pattern in repeated ROs are same (i.e., same index of the SSB pattern in repeated ROs), so that the UE could transmit a same preamble in each repetition. However, in some cases, the unified SSB pattern ordering scheme cannot achieve this goal. In such cases, the differential ordering scheme is proposed to achieve this goal.

Figure 10:
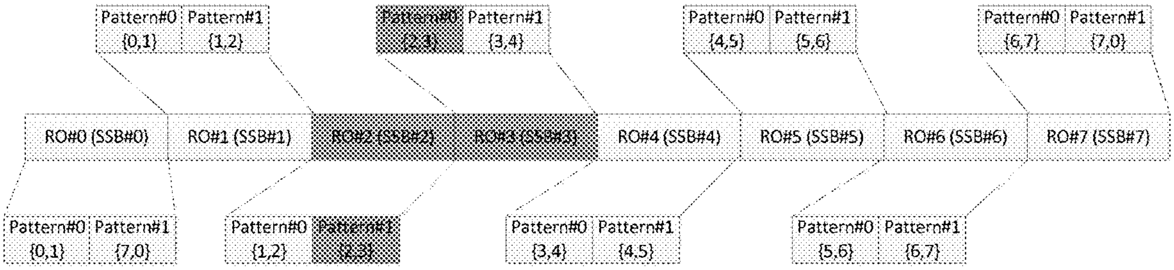
FIG. 10 illustrates an exemplary RO selection and preamble partitioning method according to some other embodiments of the present application.

For example, FIG. 10 illustrates an exemplary RO selection and preamble partitioning method according to some other embodiments of the present application.

Referring to FIG. 10, it is assumed that:

there are 8 SSBs indexed with SSB #0 to SSB #7 and 8 ROs indexed with RO #0 to RO #7 configured for the UE;

the association between SSB and RO is 1-to-1 association.

the configuration information includes eight SSB patterns for PRACH repetitions, which are {0,1}, {1,2}, {2,3}, {3,4} {4,5} {5,6} {6,7} {7,0}.

From the UE's perspective, the UE may determine an SSB pattern, e.g., SSB pattern {2,3} from the eight SSB patterns. Based on the determined SSB pattern {2.3}, the UE may determine a set of ROs for PRACH repetitions to be ROs {2,3}.

Then, for each RO of ROs {2,3}, the UE may determine a set of SSB patterns associated with RO. For example, for RO #2, the UE may determine SSB patterns {1,2} and {2,3} are associated with the RO #2 because SSB #2 is included in both the two patterns; for RO #3, the UE may determine SSB patterns {2,3} and {3,4} are associated with the RO #3 because SSB #3 is included in both the two patterns.

Then, for an RO of the set of ROs, the UE may determine a set of preambles associated with each SSB pattern in the set of SSB patterns.

In the example of FIG. 10, for each RO, the SSB patterns in the set of SSB patterns may be ordered based on the same ordering scheme, i.e., firstly ordering the SSB pattern(s) in the set of SSB patterns associated with an RO according to orders of the SSB pattern(s) in the plurality of SSB patterns; and secondly ordering the ordered SSB pattern(s) based on an increasing order of index(es) of SSB(s) associated with the RO. Taking RO #2 as an example, the SSB patterns {1,2} and {2,3} may be firstly ordered according to orders of the SSB pattern(s) in the plurality of SSB patterns, i.e., the SSB patterns {1,2} may be the first pattern (e.g., pattern #0) in the set of SSB patterns and {2,3} may be the second pattern (e.g., pattern #1) in the set of SSB patterns. Since the two SSB patterns only includes an SSB (e.g., SSB #2) associated with RO #1, the operation regarding secondly ordering does not need to be performed. For other ROs, the UE may perform the same operation with RO #2. That is, for RO #3, the SSB patterns {2,3} may be the first pattern (e.g., pattern #0) in the set of SSB patterns and {3,4} may be the second pattern (e.g., pattern #1) in the set of SSB patterns The SSB pattern ordering may also be achieved by firstly ordering the SSB pattern(s) of a first SSB in the set of SSB patterns associated with an RO according to order of the SSB pattern(s) of the first SSB in the plurality of SSB patterns; and secondly ordering the SSB pattern(s) based on an increasing order of index(es) of SSB(s) associated with the RO. Still taking RO #2 as an example, since only SSB #2 is associated with RO #1, the first SSB is SSB #2. The SSB patterns {1,2} and {2,3} may be firstly ordered according to orders of the SSB pattern(s) in the plurality of SSB patterns, i.e., the SSB patterns {1,2} may be the first pattern (e.g., pattern #0) in the set of SSB patterns and {2,3} may be the second pattern (e.g., pattern #1) in the set of SSB patterns. For other ROs, the UE may perform the same operation with RO #1.

It is assumed that the plurality of preambles are {0, . . . , 7}. For each RO, the UE may partition preambles {0, . . . , 7} into two sets of preambles, i.e., preambles {0, 1,2,3} and preambles {4,5,6,7}. Then, for RO #2, based on the ordered SSB patterns, the UE may determine that the first set of preambles {0,1,2,3} is associated with the pattern #0 (i.e., SSB pattern {1,2}) and the second set of preambles {4,5,6, 7} is associated with pattern #1 (i.e., the SSB pattern {2,3}). However, for RO #3, based on the ordered SSB patterns, the UE may determine that the first set of preambles {0,1,2,3} is associated with the pattern #0 (i.e., SSB pattern {2,3}) and the second set of preambles {4,5,6,7} is associated with pattern #1 (i.e., the SSB pattern {3,4}).

That is, the determined SSB pattern {2,3} for RO #2 and RO #3 is associated with different set of preambles. In such cases, the UE may select different preambles in RO #2 and RO #3, which cannot achieve the above goal that the preambles for a same SSB pattern in repeated ROs are same (i.e., same index of the SSB pattern in repeated ROs).

From the BS' perspective, for each SSB pattern of SSB patterns {0,1}, {1,2}, {2,3}, {3,4} {4,5} {5,6} {6,7} {7,0}, the BS may perform the same methods as those performed by the UE. Consequently, for each RO of the 8 ROs, the BS may determine a set of SSB patterns associated with the RO, which is illustrated in FIG. 10. Then, for each RO, the BS may determine a set of preambles associated with each SSB pattern of the set of SSB patterns associated with the RO based on the same method used by the UE.

Figure 11:
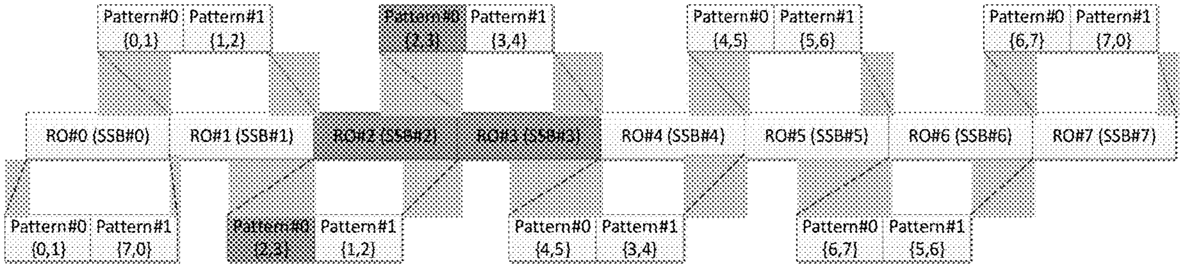
FIG. 11 illustrates an exemplary RO selection and preamble partitioning method according to some other embodiments of the present application.

FIG. 11 illustrates an exemplary RO selection and preamble partitioning method according to some other embodiments of the present application.

Referring to FIG. 11, the difference between FIG. 9 and FIG. 10 is that: in FIG. 10, for each RO, the SSB pattern(s) in the set of SSB patterns are ordered based on a differential ordering scheme. The differential ordering scheme includes ordering SSB pattern(s) in a set of SSB patterns associated with a latter RO based on order(s) of SSB pattern(s) in a set of SSB patterns associated with former RO(s).

For example, RO #0 is associated with SSB pattern {0,1} and {7,0}, wherein pattern {0,1} is ordered as pattern #0 and pattern {7,0} is ordered as pattern #1 based on the relative indexes of these two patterns in the configured patterns.

For RO #1, the SSB patterns are ordered by referring to the orders for RO #0. Accordingly, for RO #1, the SSB pattern {0,1} is ordered as pattern #0, which is the same as that in RO #0, and SSB pattern {1,2} is ordered as pattern #1.

For RO #2, the SSB patterns are ordered by referring to the orders for RO #0 and RO #1. Accordingly, for RO #2, SSB pattern {1,2} is ordered as pattern #1, which is the same as that for RO #1, and SSB pattern {2,3} is ordered as pattern #0.

The orders of SSB patterns for other ROs are determined similarly. Accordingly, for RO #3, SSB pattern {2,3} is ordered as pattern #0, which is the same has that for RO #2.

Consequently, based on the differential ordering scheme, the determined SSB pattern {2,3} for RO #2 and RO #3 is associated with the same set of preambles because it has the same order in RO #2 and RO #3. In such cases, the UE may select a preamble from the same set of preambles associated with SSB pattern {2,3} and transmit the preamble in RO #2 and RO #3, i.e., achieving the goal that the same preamble is used in different repetitions.

Figure 12:
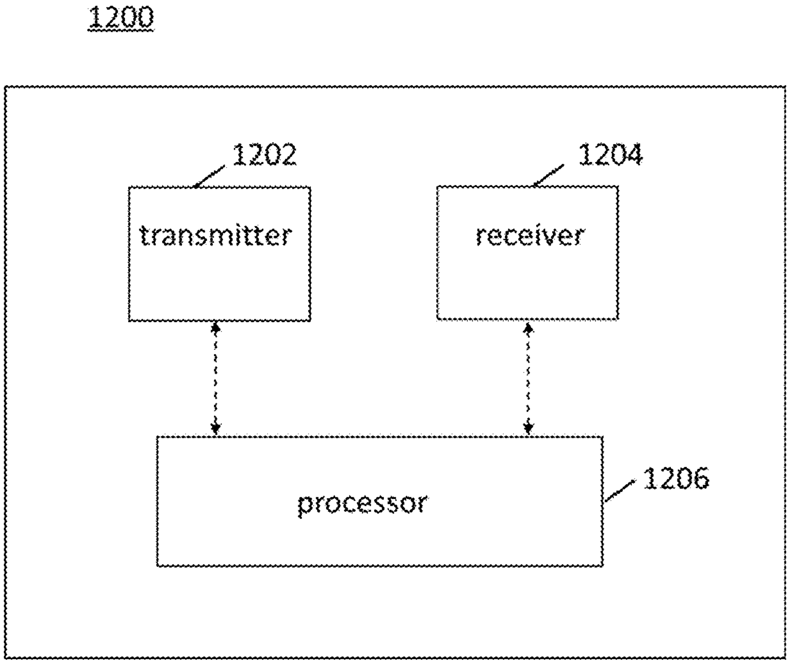
FIG. 12 illustrates a simplified block diagram of an exemplary apparatus for PRACH repetition according to some embodiments of the present application.

FIG. 12 illustrates a simplified block diagram of an exemplary apparatus 1200 for PRACH repetition according to some embodiments of the present application. The apparatus 1200 may be a UE (e.g., UE 102*a* or UE 102*b*) or a BS (e.g., BS 101) as described above.

Referring to FIG. 12, the apparatus 1200 may include at least one transmitter 1202, at least one receiver 1204, and at least one processor 1206. The at least one transmitter 1202 is coupled to the at least one processor 1206, and the at least one receiver 1204 is coupled to the at least one processor 1206.

Although in this figure, elements such as the transmitter 1202, the receiver 1204, and the processor 1206 are illustrated in the singular, the plural is contemplated unless a limitation to the singular is explicitly stated. In some embodiments of the present application, the transmitter 1202 and the receiver 1204 may be combined to one device, such as a transceiver. In some embodiments of the present application, the apparatus 1200 may further include an input device, a memory, and/or other components. The transmitter 1202, the receiver 1204, and the processor 1206 may be configured to perform any of the methods described herein (e.g., the method described with respect to any of FIGS. 4-11).

According to some embodiments of the present application, the apparatus 1200 may be a UE, and the transmitter 1202, the receiver 1204, and the processor 1206 may perform operations of the method as described with respect to FIG. 4. For example, the receiver 1204 may receive configuration information. The processor 1206 may: determine a plurality of SSB patterns based on the configuration information, wherein each SSB pattern includes one or more SSBs; determine an SSB pattern from the plurality of SSB patterns; determine a set of ROs for PRACH repetition based on the determined SSB pattern; determine, from the plurality of SSB patterns, a set of SSB patterns associated with each RO of the set of ROs, wherein the set of SSB patterns include the determined SSB pattern; and determine a set of preambles associated with each SSB pattern of the set of SSB patterns.

According to some embodiments of the present application, the apparatus 1200 may be a BS, and the transmitter 1202, the receiver 1204, and the processor 1206 may perform operations of the method as described with respect to FIG. 7. For example, a transmitter 1202 may transmit configuration information. The processor 1206 may: determine a plurality of SSB patterns, wherein each SSB pattern of the plurality of SSB patterns includes one or more SSBs; determine, for an SSB pattern of the plurality of SSB patterns, a set of ROs for PRACH repetition based on the SSB pattern; determine, from the plurality of SSB patterns, a set of SSB patterns associated with each RO of the set of ROs, wherein the set of SSB patterns include the SSB pattern; and determine a set of preambles associated with each SSB pattern of the set of SSB patterns.

In some embodiments of the present application, the apparatus 1200 may further include at least one non-transitory computer-readable medium. In some embodiments of the present disclosure, the non-transitory computer-readable medium may have stored thereon computer-executable instructions to cause the processor 1206 to implement any of the methods as described above. For example, the computer-executable instructions, when executed, may cause the processor 1206 to interact with the transmitter 1202 and/or the receiver 1204, so as to perform operations of the methods, e.g., as described with respect to FIGS. 4-11.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for PRACH repetition, including a processor and a memory. Computer programmable instructions for implementing a method for PRACH repetition are stored in the memory, and the processor is configured to perform the computer programmable instructions to implement the method for PRACH repetition. The method for PRACH repetition may be any method as described in the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for PRACH repetition according to any embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed is:

1. A user equipment (UE) for wireless communication, comprising:

at least one memory; and at least one processor coupled with the at least one memory and configured to cause the UE to:

receive configuration information;

determine a plurality of synchronization signal block (SSB) patterns based on the configuration information, wherein each SSB pattern includes one or more SSBs;

determine an SSB pattern from the plurality of SSB patterns;

determine a set of random access channel (RACH) occasions (ROs) for physical random access channel (PRACH) repetition based on the determined SSB pattern, wherein the set of ROs have a same position in a frequency domain;

determine, from the plurality of SSB patterns, a set of SSB patterns associated with each RO of the set of ROs, wherein the set of SSB patterns include the determined SSB pattern; and determine a set of preambles associated with each SSB pattern of the set of SSB patterns.

2. The UE of claim 1, wherein the configuration information includes the plurality of SSB patterns, or the configuration information includes a set of offsets for determining the plurality of SSB patterns.

3. The UE of claim 1, wherein the SSB pattern is determined based on a measurement of a channel quality of SSBs included in each SSB pattern of the plurality of SSB patterns.

4. The UE of claim 1, wherein the set of ROs are determined from a start of an SSB to RO mapping cycle, or from a start of an SSB to RO association period, or from a start of an SSB to RO association pattern period.

5. The UE of claim 1, wherein the at least one processor is further configured to cause the UE to determine an SSB pattern to be associated with an RO of the set of ROs when the SSB pattern includes an SSB associated with the RO.

6. The UE of claim 1, wherein the at least one processor is further configured to cause the UE to:

partition a plurality of preambles for the set of SSB patterns into a plurality of sets of preambles; and orders SSB patterns in the set of SSB patterns;

wherein the set of preambles associated with each SSB pattern of the set of SSB patterns is determined from the plurality of sets of preambles based on an order of each SSB pattern in the set of SSB patterns.

7. The UE of claim 6, wherein for each RO of the set of ROs, the SSB patterns in the set of SSB patterns associated with the RO are ordered based on the same ordering scheme.

8. The UE of claim 7, wherein the same ordering scheme includes:

ordering SSB patterns of a first SSB in the set of SSB patterns associated with an RO according to order of the SSB patterns of the first SSB in the plurality of SSB patterns; and ordering SSB patterns based on an increasing order of indexes of SSBs associated with the RO.

9. The UE of claim 6, wherein for each RO of the set of ROs, the SSB patterns in the set of SSB patterns are ordered based on a differential ordering scheme, wherein the differential ordering scheme includes ordering SSB patterns in a set of SSB patterns associated with a latter RO based on order(s) of SSB patterns in a set of SSB patterns associated with former ROs.

10. The UE of claim 9, wherein the at least one processor is further configured to cause the UE to: for an SSB pattern associated with both a former RO and the latter RO, determine an order of the SSB pattern in a set of SSB patterns associated with the latter RO to be the same as an order of the SSB pattern in a set of SSB patterns associated with the former RO.

11. The UE of claim 1, wherein the at least one processor is further configured to cause the UE to select a preamble from a set of preambles associated the determined SSB pattern, and transmit the preamble in each RO of the set of ROs.

12. The UE of claim 11, wherein the at least one processor is further configured to cause the UE to:

start a random access response (RAR) window after a time gap relative to a transmission of the preamble in a first RO of the set of ROs; and when an RAR is received in the RAR window before finishing transmitting the preamble in all ROs of the set of ROs, terminate transmitting the preamble.

13. The UE of claim 1, wherein the at least one processor is further configured to cause the UE to determine a beam for transmitting messages after preamble transmission based on a random access radio network temporary identifier (RA-RNTI) associated with downlink control information (DCI) scheduling an RAR.

14. A base station (BS) for wireless communication, comprising:
at least one memory; and
at least one processor coupled with the at least one memory and configured to cause the BS to:
determine a plurality of synchronization signal block (SSB) patterns, wherein each SSB pattern of the plurality of SSB patterns includes one or more SSBs;
determine, for an SSB pattern of the plurality of SSB patterns, a set of random access channel (RACH) occasions (ROs) for physical random access channel (PRACH) repetition based on the SSB pattern, wherein the set of ROs have a same position in a frequency domain;
determine, from the plurality of SSB patterns, a set of SSB patterns associated with each RO of the set of ROs, wherein the set of SSB patterns include the SSB pattern; and
determine a set of preambles associated with each SSB pattern of the set of SSB patterns.

15. A method performed by a user equipment (UE), the method comprising:
receiving configuration information;
determining a plurality of synchronization signal block (SSB) patterns, wherein each SSB pattern includes one or more SSBs;
determining an SSB pattern from the plurality of SSB patterns;
determining a set of random access channel (RACH) occasions (ROs) for physical random access channel (PRACH) repetition based on the determined SSB pattern, wherein the set of ROs have a same position in a frequency domain;
determining, from the plurality of SSB patterns, a set of SSB patterns associated with each RO of the set of ROs, wherein the set of SSB patterns include the determined SSB pattern; and
determining a set of preambles associated with each SSB pattern of the set of SSB patterns.

16. The method of claim 15, wherein the set of ROs are determined from a start of an SSB to RO mapping cycle, or from a start of an SSB to RO association period, or from a start of an SSB to RO association pattern period.

17. The method of claim 15, further comprising determining an SSB pattern to be associated with an RO of the set of ROs when the SSB pattern includes an SSB associated with the RO.

18. A processor for wireless communication, comprising:
at least one controller coupled with at least one memory and configured to cause the processor to:
receive configuration information;
determine a plurality of synchronization signal block (SSB) patterns based on the configuration information, wherein each SSB pattern includes one or more SSBs;
determine an SSB pattern from the plurality of SSB patterns;
determine a set of random access channel (RACH) occasions (ROs) for physical random access channel (PRACH) repetition based on the determined SSB pattern, wherein the set of ROs have a same position in a frequency domain;
determine, from the plurality of SSB patterns, a set of SSB patterns associated with each RO of the set of ROs, wherein the set of SSB patterns include the determined SSB pattern; and
determine a set of preambles associated with each SSB pattern of the set of SSB patterns.

19. The processor of claim 18, wherein the configuration information includes the plurality of SSB patterns or a set of offsets for determining the plurality of SSB patterns.

20. The processor of claim 18, wherein the set of ROs are determined from a start of an SSB to RO mapping cycle, from a start of an SSB to RO association period, or from a start of an SSB to RO association pattern period.

* * * * *